(12) United States Patent
Patterson et al.

(10) Patent No.: US 11,748,825 B2
(45) Date of Patent: Sep. 5, 2023

(54) OPERATING SMART SENSORS USING DISTRIBUTED LEDGERS

(71) Applicant: Itron, Inc., Liberty Lake, WA (US)

(72) Inventors: Tim Patterson, Baltimore, MD (US); Lucas Scheidler, Oakland, CA (US)

(73) Assignee: Itron, Inc., Liberty Lake, WA (US)

( * ) Notice: Subject to any disclaimer, the term of this patent is extended or adjusted under 35 U.S.C. 154(b) by 363 days.

(21) Appl. No.: 16/024,652

(22) Filed: Jun. 29, 2018

(65) Prior Publication Data

US 2020/0005404 A1 Jan. 2, 2020

(51) Int. Cl.
G06Q 50/06 (2012.01)
G06Q 20/10 (2012.01)
G06F 8/65 (2018.01)

(52) U.S. Cl.
CPC ............... *G06Q 50/06* (2013.01); *G06F 8/65* (2013.01); *G06Q 20/10* (2013.01)

(58) Field of Classification Search
CPC ...................................................... G06Q 50/06
See application file for complete search history.

(56) References Cited

U.S. PATENT DOCUMENTS

| | | | |
|---|---|---|---|
| 9,467,754 B1 | 10/2016 | Sparks et al. | |
| 2004/0095237 A1* | 5/2004 | Chen | G06F 11/0772 340/506 |
| 2007/0013547 A1 | 1/2007 | Boaz | |
| 2010/0185338 A1 | 7/2010 | Montgomery et al. | |
| 2010/0289652 A1 | 11/2010 | Javey et al. | |
| 2014/0129160 A1* | 5/2014 | Tran | G01R 21/007 702/61 |
| 2014/0358482 A1* | 12/2014 | Sehgal | G06Q 20/12 702/186 |
| 2015/0276253 A1* | 10/2015 | Montalvo | H04L 12/2803 700/276 |

(Continued)

FOREIGN PATENT DOCUMENTS

| | | |
|---|---|---|
| CN | 107688944 A | 2/2018 |
| EP | WO2017067587 A1 | 4/2017 |
| EP | WO2017092788 A1 | 6/2017 |

OTHER PUBLICATIONS

Pop, C., Cioara, T., Antal, M., Anghel, I., Salomie, I., & Bertoncini, M. (2018). Blockchain based decentralized management of demand response programs in smart energy grids. Sensors, 18(1), 162. doi:http://dx.doi.org/10.3390/s18010162 (Year: 2018).*

(Continued)

*Primary Examiner* — Michael P Harrington
(74) *Attorney, Agent, or Firm* — Lee & Hayes, P.C.

(57) ABSTRACT

A distributed ledger based utility system architecture may be configured to enable secure payments, data transmission, and meter configuration of smart sensors. The utility system architecture may be a tiered architecture including multiple nodes at different levels of the architecture where each level may contain a different portion of the distributed ledger. As information is added to the distributed ledger, each portion of the distributed ledger may be updated based on whether the information is relevant to that node. The information may include rate contract transactions, meter configuration data transactions, payment transactions, or the like.

20 Claims, 13 Drawing Sheets

(56) References Cited

U.S. PATENT DOCUMENTS

| | | | |
|---|---|---|---|
| 2015/0276431 A1 | 10/2015 | Ishida | |
| 2017/0073211 A1 | 3/2017 | Wilson et al. | |
| 2017/0103468 A1 | 4/2017 | Orsini et al. | |
| 2017/0206522 A1* | 7/2017 | Schiatti | G06Q 50/06 |
| 2017/0228731 A1 | 8/2017 | Sheng et al. | |
| 2017/0330294 A1* | 11/2017 | Murakami | G05B 15/02 |
| 2017/0358041 A1* | 12/2017 | Forbes, Jr. | H02J 13/00001 |
| 2018/0038895 A1* | 2/2018 | Pambucol | G01R 11/24 |
| 2018/0130130 A1 | 5/2018 | Dechu et al. | |
| 2018/0182048 A1 | 6/2018 | Stocker et al. | |
| 2019/0123580 A1* | 4/2019 | Bindea | G05B 13/026 |
| 2019/0353685 A1* | 11/2019 | Almeida Cavoto | G06Q 20/145 |
| 2019/0393722 A1* | 12/2019 | Stöcker | H02J 13/00034 |
| 2020/0005264 A1 | 1/2020 | Patterson et al. | |
| 2020/0005403 A1 | 1/2020 | Patterson et al. | |

OTHER PUBLICATIONS

CoinStaker, "Blockchain is changing the enerty commodies industry," retrieved at <<https://www.coinstaker.com/blockchain-changing-energy-industry/>> on Apr. 3, 2018, 5 pages.

Kvaternik, et. al., "Privacy-Preserving Platform for Transactive Energy Systems", arxiv.org, Cornell University Library, Sep. 27, 2017, 6 pages.

PCT Search Report dated Oct. 15, 2019, for PCT Application No. PCT/US19/39845, 12 pages.

Walker, et. al., "PlaTIBART: a Platform for Transactive IoT Blockchain Applications with Repeatable Testing", arxiv.org, Cornell University Library, Sep. 27, 2017, 7 pages.

Non Final Office Action dated May 15, 2020 for U.S. Appl. No. 16/024,632 "Operating Smart Sensors Using Distributed Ledgers", Patterson, 33 pages.

Non Final Office Action dated Jun. 12, 2020 for U.S. Appl. No. 16/024,572, "Operating Smart Sensors Using Distributed Ledgers", Patterson, 27 pages.

Office Action for U.S. Appl. No. 16/024,632, dated Nov. 24, 2020, Patterson, "Operating Smart Sensors Using Distributed Ledgers", 56 Pages.

Non Final Office Action dated Aug. 2, 2021 for U.S. Appl. No. 16/024,632 "Operating Smart Sensors Using Distributed Ledgers", Patterson, 45 pages.

Office Action Action for U.S. Appl. No. 16/024,572, dated Sep. 15, 2021, Patterson, "Operating Smart Sensors Using Distributed Ledgers", 34 Pages.

Office Action for U.S. Appl. No. 16/024,632, dated Feb. 7, 2022, Patterson, "Operating Smart Utility Meters Using Distributed Ledgers", 47 pages.

Office Action for U.S. Appl. No. 16/024,572, dated Mar. 4, 2022, Patterson, "Operating Smart Sensors Using Distributed Ledgers", 33 pages.

Office Action for U.S. Appl. No. 16/402,572, dated Aug. 15, 2022, Patterson, "Operating Smart Sensors Using Distributed Ledgers",39 pages.

Office Action for U.S. Appl. No. 16/024,632, dated Aug. 1, 2022, Patterson, "Operating Smart Utility Meters Using Distributed Ledgers", 79 pages.

* cited by examiner

OPERATING SMART SENSORS USING DISTRIBUTED LEDGERS

BACKGROUND

Utility meters such as electric, water, and natural gas meters have evolved from isolated devices that simply measure utility consumption and display a consumption reading to so called "smart meters" that are connected devices capable of reporting resource consumption readings automatically over a utility communication network. Conventional utility communication networks have been large, centrally managed private networks. More recently there have been efforts to decentralize networks and distribute more functionality down the network (e.g., closer to the edge) to be performed by individual nodes (e.g., smart meters, routers, relays, transformers, etc.) throughout the networks. In some examples, distributed and/or decentralized networks can reduce latency of communication by reducing the distance information must travel to be acted upon by relevant devices, and/or can make networks more robust against failure of individual nodes in the network. However, to date, decentralization and distribution of computing among network nodes have been limited by, for example, security concerns, accuracy of individual nodes, computing power of individual nodes, and regulatory requirements.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Overview of Tiered Utility System Architecture

Figure 1:
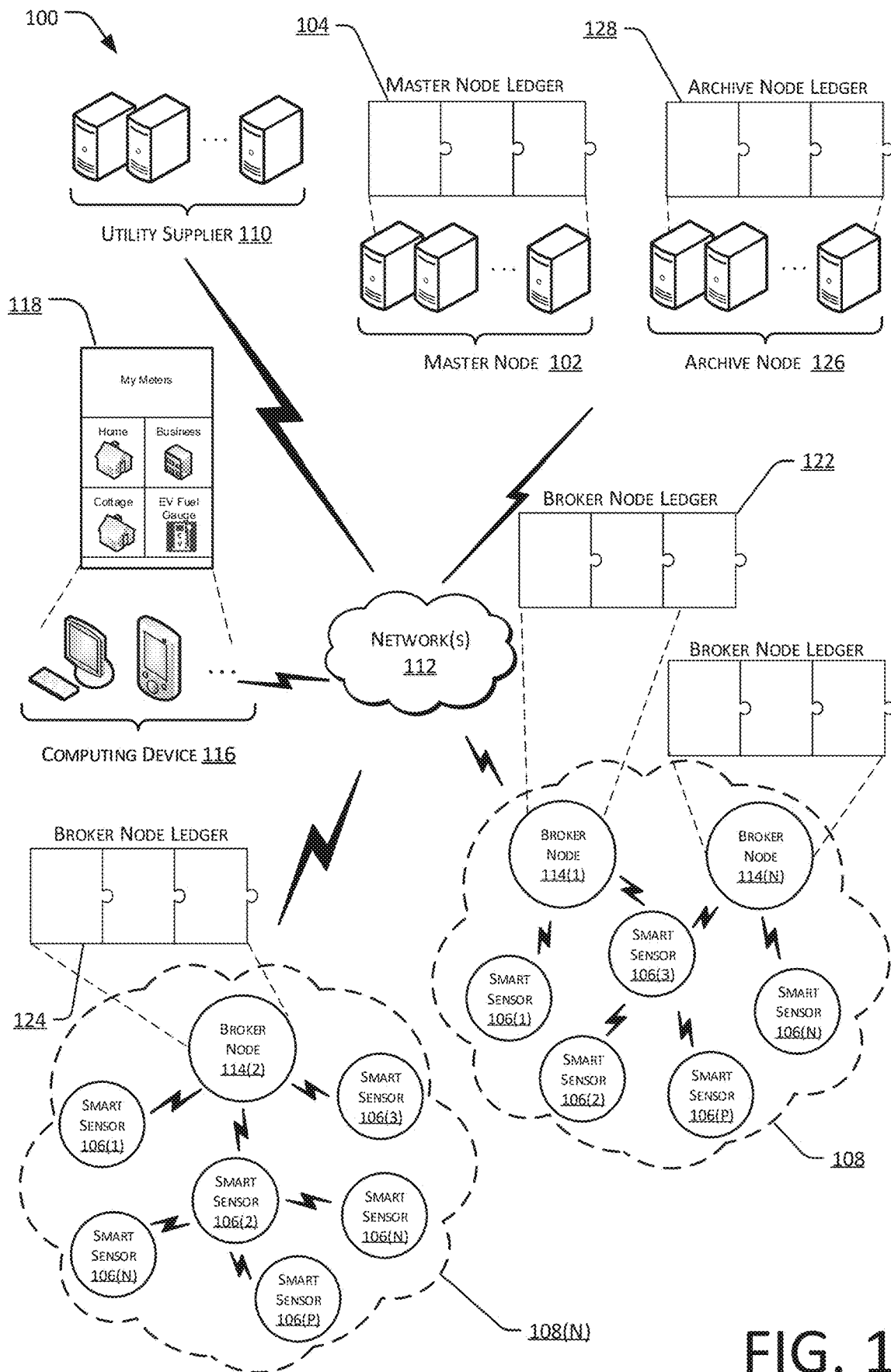
FIG. 1 is a schematic diagram of an example architecture including a master node usable to facilitate a transaction on a distributed ledger associated with one or more smart utility meters, smart sensors, or other network computing devices.

Current utility network infrastructure systems make it difficult for utility companies to configure smart sensors to apply specific billing rates and to adjust meter configuration data. A billing rate may be different for each customer based on a variety of factors (e.g., time of day, type of consumer, weather, etc.) and meter configuration updates may be different for each smart sensor based on a meter type, a meter location, a meter update history, etc. Furthermore, existing payment systems put utility suppliers at a disadvantage in that a resource is provided to a consumer and then the consumer pays for the resource at a later date. This puts strain on a utility supplier because the utility supplier may not be able to accurately predict how much resource a region of users may consume, which may cause a scarcity of the resource. Additionally, the utility supplier may not be compensated for the resource provided to the consumer for weeks or months after the resource has been consumed, adding a financial strain on the utility supplier as well. Furthermore, the methods of payment currently in place for paying a utility bill (e.g., mail, web portal, etc.) often lack the security necessary for sharing consumption and billing data with relevant actors while protecting consumer information, such as credit card numbers, bank account numbers, birthdates, addresses, etc.

This patent application describes a distributed ledger that enables application of smart contracts to smart sensors. In some examples, they can allow for near-real time payment of resources, application of specified rate contracts for individual meters, application of specified meter configuration data for individual meters, enablement of smart sensors to participate in a demand response event, and location awareness.

In some examples, the distributed ledger may be implemented in a hierarchical or tiered utility system architecture. The tiered architecture may include multiple nodes at different levels of the architecture. Each level may contain a different portion of the distributed ledger. For instance, the tiered architecture may include master nodes, broker nodes, and smart sensors (i.e., meter nodes). The master nodes may contain a distributed ledger that stores metadata associated with multiple distributed ledgers associated with a utility network. That is, the distributed ledger stored at the master node may comprise a digest or index of cross-reference entries to multiple other distributed ledgers stored by various entities in the utility network. Each broker node may contain one of the distributed ledgers associated with the utility network and may be in communication with a plurality of smart sensors. The distributed ledgers stored by the broker nodes may comprise a transaction ledger including transactions associated with the broker node and any smart sensors in communication with the respective broker node. In some examples, each smart sensor may contain a portion of the distributed ledger that relates to the respective smart sensor. As information is added to the distributed ledger, each smart sensor may communicate with its respective broker node and determine if the information is relevant to itself. For example, a broker node may receive transaction data from a payment gateway and the broker node may validate the information included in the transaction data. Once validated, the broker node may add the information to the distributed ledger local to the broker node and may gossip the transaction data to a plurality of smart sensors that are in communication with the broker node. If a smart sensor determines that the transaction data pertains to itself, then the smart sensor may perform an action based on the information included in the transaction data. In some examples, the smart sensor may store a local instance of the distributed ledger of the broker node containing the transaction data that is relevant to itself. In some examples, an archive node may store a distributed ledger that may be configured to a full and complete copy of all of the distributed ledgers, such that the information can be accessed at any period of time.

In some examples, the distributed ledger may store transactions according to an encryption scheme that obscures the digital addresses of the senders and recipients. The distributed ledger may therefore deviate from a traditional ledger in that the ledger information is not cognizable by a human or even computers that are not privy to the transaction. This provides enhanced security necessary for sharing consumption and billing data with relevant actors while protecting consumer information, such as credit card numbers, bank account numbers, birthdates, addresses, etc. Although some examples discussed herein include a distributed ledger comprised of a blockchain, there may be different underlying distributed ledger technology that is not based upon a blockchain. For instance, any of the techniques discussed herein may be implemented using a distributed ledger that utilizes a distributed acyclic graph Overview of Rate Contracts As discussed above, current utility network infrastructure systems make it difficult for utility companies to configure smart sensors to apply specific billing rates and to adjust meter configuration data. In one aspect, a distributed ledger may be utilized to instruct a smart sensor to apply a specific rate contract. For instance, a master node may be stored and operated on one or more servers that are in communication with a utility supplier (e.g., via a utility supplier server). The master node may be in communication with multiple broker nodes covering a region that the utility supplier provides a resource to. Each broker node may be in communication with multiple smart sensors (i.e., meter nodes) that are local to a given broker node and provide the resource to a consumer location. A broker node may receive an indication from the master node that an update has occurred to the distributed ledger located at the master node level. The update may include information regarding a rate contract, meter configuration data, payment information regarding a customer balance, etc. The broker node may update a distributed ledger that is local to the broker node (e.g., add a block to a blockchain located at the broker node) to reflect the update that occurred at the master node level. As each broker node periodically communicates with the smart sensors that are within the broker node's local area network, each smart sensor may determine if the updated information in the broker node distributed ledger contains information that pertains to itself. If the updated information in the broker node distributed ledger does contain relevant information or contains an instruction for a specific smart sensor, then the specified smart sensor may update an instance of a portion of the distributed ledger that is local to the smart sensor (i.e., meter node).

In one aspect, the updated information may include a rate contract that specifies a bill rate for a resource based on a variety of factors (e.g., a time of day, a forward consumption of a resource, a backward consumption of a resource, a peak demand, a power factor, a class of customer, a type of payee, etc.). Once the smart sensor determines that the updated information is relevant to itself, the smart sensor may update an instance of a portion of the distributed ledger that is local to the smart sensor such that the bill rate of the smart sensor reflects the specified bill rate in the rate contract.

In another aspect, the updated information may include meter configuration data that causes the smart sensor to perform a configuration action (e.g., update software, set a channel hopping sequence, set a data rate, set a signal strength, set a communication protocol, alter the data channels collected, etc.). Once the smart sensor determines that the updated information is relevant to itself, the smart sensor may update an instance of a portion of the distributed ledger that is local to the smart sensor, which may trigger the smart sensor to perform the configuration action in accordance with the meter configuration data specified in the distributed ledger.

In another aspect, the updated information may include an indication that a payment was made by a user associated with the smart sensor. The smart sensor may store a balance associated with an account that the user has with the utility supplier. The user may be able to add currency to the account via a payment application or website in communication with the master node. The master node may send the transaction to the broker node that is associated with the smart sensor to which the user wishes to add to the balance. The broker node may record the transaction on its distributed ledger if the transaction involves a smart sensor that is part of the subset of smart sensors that the broker node communicates with. Each update to the distributed ledger may include an identification (hereinafter a "block ID"). As each broker node periodically communicates with the smart sensors that are within the broker node's local area network, each smart sensor may determine if a new block ID is present in the distributed ledger. If so, the smart sensor may determine if the information in the update, in this case, transaction information, is relevant to the smart sensor. If the transaction information is relevant to the smart sensor, then the smart sensor may increment the account balance. In examples in which the smart sensor maintains a local instance of a distributed ledger, the smart sensor may update its local instance of the portion of the distributed ledger to reflect the currency added to the account stored on the smart sensor. Once the smart sensor account has a sufficient balance, then the smart sensor may allow a resource to flow through to a site associated with the user (e.g., a home, business, worksite, etc.).

Overview of Demand Response

Current utility network infrastructure systems are unable to accurately predict how much resource a region of users may consume, which may cause a scarcity of the resource and/or may cause inefficient generation of resources to meet peak demands. In another aspect, the tiered architecture may enable a utility system to perform a demand response event. For instance, a smart sensor may identify multiple loads receiving a resource located at site associated with a user. The smart sensor may send load data containing the identified loads to a broker node that is in communication with multiple smart sensors. The master node, which may, in some cases, include the utility supplier, may determine that a demand response event is necessary in order to meet current demand for a portion of a utility grid, and may transmit a demand response event notification to the broker node. The broker node may determine which loads from the load data to shed (e.g., turned off or limited) in order to fulfill the demand response event and may provide this information to the master node. The master node may then send a demand response offer to a user associated with the smart sensor inquiring if the user will participate in the demand response event. The user may affirmatively opt in to participate in the demand response event (e.g., by responding to the offer, sending a text, accessing an app on the user's computing device, etc.), or may simply comply with the offer (e.g., turning off their air conditioner at a requested time). If the user indicates that they are willing to participate in the demand response event, the master node may record the agreement on the distributed ledger, which may be propagated down to the broker node level and subsequently recorded to the distributed ledger of the broker node. In some cases, the user may receive an automatic credit for participating in the demand response event.

Overview of Location Awareness

Current utility network infrastructure systems are unable to track and locate lost or stolen smart sensors. In another aspect, the tiered architecture may enable a smart sensor to recognize whether it is in its proper installation location by referencing a signal unique to the installation location. For example, an installation locator, such as a passive radio frequency identification data tag ("RFID tag"), may be permanently affixed to an inside of a service panel that is proximate to the smart sensor. The installation locator may comprise a unique identifier. In some examples, a hash function may be applied to the unique identifier of the installation locator and a unique identifier of the smart sensor (e.g., serial number, machine identifier (MAC), etc.). The master node may record instructions on the distributed ledger to perform a location awareness operation, which may be propagated down to the broker node level and subsequently recorded to the distributed ledger of the broker node. The broker node may then send instructions to the smart sensor causing the smart sensor to interrogate the installation locator installed on the service panel. When the smart sensor interrogates the installation locator, the smart sensor performs the hash function, and then validates that the calculated identifier matches the identifier stored on a memory of the smart sensor. If the validation fails, then the smart sensor may notify the broker node and/or master node that validation failed and the smart sensor may enter a disconnect mode. In some examples, the smart sensor may be configured to periodically interrogate the installation locator installed on the service panel and to perform the hash function to validate the calculated identifier. Again, if the validation fails, then the smart sensor may notify the broker node and/or master node (e.g., send a transmission) that validation failed and the smart sensor may enter a disconnect mode.

As used herein the term "utility supplier" means any provider or distributor of a resource including, without limitation, a utility providing company, a utility distribution company, a smart city, a municipality, a retailer or vendor, a co-op, a micro grid, or an individual.

This brief overview is provided for the reader's convenience and is not intended to limit the scope of the claims, nor the proceeding sections. Furthermore, the techniques described in detail below may be implemented in a number of ways and in a number of contexts. Several example implementations are provided with reference to the following figures, as described below in more detail. However, the following implementations and context are but few of many.

Example Utility System

FIG. 1 is a diagram illustrating an example networked environment or architecture 100 including a master node 102. The master node 102 includes a distributed ledger 104 that may be utilized to receive transactions involving one or more utility meters or other smart sensors 106(1), 106(2), 106(3), . . . 106(N) (collectively referred to as "smart sensors 106"), where N is any integer greater than or equal to 1. The term "smart sensor" means a measuring and/or sensing equipment which measures or senses physical parameters (e.g., energy, power, voltage, power factor, temperature, gas pressure, flow rate, etc.) and has the ability to communicate this information via a network. By way of example and not limitation, smart sensors may include utility meters (e.g., electricity, water, or gas meters), relays, repeaters, smart grid routers, transformers or any such utility network computing device. Each smart sensor 106 may include a balance associated with a user such that the user can add a currency (e.g., cryptocurrency, fiat, token, etc.) to the balance in exchange for a resource. In the illustrated example, the smart sensors 106 are arranged in a mesh network defining an autonomous routing area 108. However, in other examples, the meters may be arranged in a star network or other network topology. Regardless of the topology of the autonomous routing area 108, individual smart sensors or "meter nodes" may be in communication by wireless (e.g., radio frequency) and/or wired (e.g., power line communication, Ethernet, serial, etc.) connections. There may be any number of autonomous routing areas 108(N), where N is any integer greater than or equal to 1. The smart sensors 106 may be configured to collect information (e.g., resource consumption information, network traffic information, weather information, etc.) and to report the collected information to a utility supplier 110 via a wired or wireless network 112, such as the Internet, a cellular network, or the like. The network 112 may itself be made up of one or more other wired and/or wireless networks. In the illustrated example, a broker node 114 acts as a root or edge node of the autonomous routing area 108 to relay communications from other smart sensors 106 in the autonomous routing area 108 to the utility supplier 110 over the network 112 and to relay information from the master node 102 to the smart sensors 106 over the network 112. The broker node 114 may alternatively be referred to as a shard node. The smart sensor 106(P) may be representative of another computing device located in the autonomous routing area 108. For instance, smart sensor 106(P) may be another smart sensor, another broker node, a data collecting node, a statistics node, or the like. The utility supplier 110 may be representative of a utility distribution company and may include one or more severs or other computing devices, which may be arranged in a single location or in multiple distributed locations. In other examples, the utility supplier 110 may be a utility providing company (e.g., electricity generation company), a smart city, a municipality, a retailer or vendor, a co-op, a micro grid, an individual, or any other provider or distributor of a resource.

The master node 102 may comprise one or more computers that store a copy of the distributed ledger 104 per a blockchain scheme, as illustrated in FIG. 1. The distributed ledger 104 is illustrated as a blockchain that depicts the first two blocks of the blockchain. The blocks are depicted as puzzle pieces to represent the encryption of a block being based on the encryption of the previous blocks. A blockchain is a public record of transactions stored in a digital ledger that is disseminated across devices participating in the blockchain. Blockchains are frequently used to back cryptocurrencies or implement smart contracts. The blockchain stores the transactions according to an encryption scheme that obscures the digital addresses of the senders and recipients of cryptocurrency and the keys for releasing cryptocurrency to the recipient. Blockchains deviate from a traditional ledger in that there may be multiple synchronous copies of a ledger stored on multiple nodes and that consensus is required to approve the addition of new blocks. That is, other nodes have to agree that the new block is valid and genuine before it is added to the ledger.

In some examples, the distributed ledger 104 includes blocks that each record one or more transactions conducted via the blockchain. The term "transaction" may refer to an activity instruction that, when received by the smart sensor 106, may cause the smart sensor 106 to perform an action. An activity instruction may include a rate contract, meter configuration data, payment information, demand response instructions, distribution automation commands, etc. The distributed ledger 104 may be a digest or index of cross-references to entries in the various blockchains of the broker nodes 114. For instance, if the master node 102 receives a request to perform a transaction at one of the smart sensors 106, then the master node 102 may access the distributed ledger 104 to determine an address of the correct broker node 114 that is associated with the respective smart sensor 106, and then provide the transaction information to the respective broker node 114.

Referring back to FIG. 1, a user (e.g., a utility supplier employee, consumer, or other user) may access a gateway stored on the master node 102 using a consumer device 116. Using a web browser or an app program resident on the computing device 116, the user may access a website or other interface 118 of the master node 102. The interface 118 may present a plurality of transaction options that are available to perform with respect to the smart sensors 106. A transaction option may include, but is not limited to, adding or adjusting a rate contract to one or more smart sensors 106, adding or adjusting meter configuration data for one or more smart sensors 106, and/or transferring funds from an account associated with a user to update a balance associated with one or more smart sensors 106. Once the user selects a transaction option, the master node 102 may access the distributed ledger 104 to determine an address of the correct broker node 114 that is associated with the respective smart sensor 106, and then provide the transaction information to the respective broker node 114. The broker node 114(1) may store a distributed ledger 122 that contains transaction data associated with the smart sensors 106 that are within its respective autonomous routing area 108. The distributed ledger of the various broker nodes 114 (i.e., distributed ledger 122 and distributed ledger 124) may comprise transaction ledgers that store transaction type information associated with the smart sensors 106. When the broker node 114 receives transaction information from the master node 102 that pertains to one of the smart sensors 106 that are within its autonomous routing area 108, the broker node may add a block to the distributed ledger 122 that is stored on the broker node 114. The broker node 114 may only store transaction information related to the smart sensors 106 located in the autonomous routing area 108 associated with the broker node 114. Additionally, the broker node 114 that stores distributed ledger 122 may include transaction information related to the neighboring autonomous routing area 108(N). The broker node 114 may periodically communicate with the smart sensors 106 of the autonomous routing area 108 and the smart sensors 106 may determine that the new block contains transaction information that is relevant to the smart sensor 106. The smart sensor 106 may determine that the transaction information is relevant by reading identification information or recipient information included in the transaction information. If the smart sensor 106 determines that the transaction information does not have any relevant information pertinent to that specific smart sensor 106, then the smart sensor 106 may continue to operate without interruption and simply add the block to the portion of the distributed ledger that is local to the smart sensor 106. In examples in which the smart sensor 106 maintains a local instance of a distributed ledger, if the smart sensor 106 determines that the transaction information does include relevant information, then the smart sensor 106 may store the block (i.e., add the block to the smart sensor distributed ledger, which is an instance of a portion of the distributed ledger 122 that is local to the smart sensor 106). Once the block is stored, the smart sensor 106 may perform an action based on an activity instruction included in the transaction information. In some examples, the smart sensor 106 may not store an entire transaction log of the distributed ledger 122, but rather, only store a header associated with each block within the distributed ledger 122. The header may contain identifying information (e.g., metadata) associated with its respective block. In some examples, the smart sensor 106 may not store any portion of the distributed ledger 122, but rather, read the information stored in the distributed ledger 122 at the broker node 114 and perform an action based on the activity instruction stored at the broker node level. In this case, the smart sensor 106 may not use blockchain methods of communication with the broker node 114. Rather, the broker node 114 may receive transaction information from the master node 102 and send the smart sensor 106 commands based on the content of the transaction information. For instance, the activity instruction stored at the broker node 114 may include a rate contract (e.g., specifying a bill rate based on a time of day, a forward consumption of a resource, a reverse consumption of a resource, a peak demand, a power factor, a class of customer, and/or a type of payee), meter configuration data (e.g., updating software on the smart sensor, setting a channel hopping sequence, setting a data rate used by the smart sensor, setting a signal strength used by the smart sensor, and/or setting a communication protocol used by the meter), and/or payment information. In cases where the activity instruction includes payment information, the activity instruction may include an instruction to transfer funds from an account associated with a user and to update a balance associated with the smart sensor 106. In cases where the smart sensor 106 does store a portion of the distributed ledger 122, once the smart sensor 106 performs the action, the smart sensor 106 may add a block to the portion of the distributed ledger 122 that is local to the smart sensor 106 indicating that the action was performed and may transmit a signal to the broker node 114 indicating that the action was performed. In cases where the smart sensor 106 does not store a portion of the distributed ledger 122, the smart sensor 106 may send a transmission, that is not through a distributed ledger channel, to the broker node 114 indicating that the action was performed. In response to receiving the transmission, the broker node 114 may then execute a distributed ledger 122 transaction indicating performance of the action and then may transmit a signal to the master node 102 indicating that the action was performed (e.g., provide a receipt to the master node 102).

In some cases, the master node 102, the broker node 114, and/or the smart sensors 106 may be configured to store information of their respective distributed ledgers for a limited duration (e.g., 30 days, 90 days, 1 year, etc.), such that the various ledgers may be deleted or overwritten from memories after a certain period of time. An archive node 126 may store a distributed ledger 128 that may be configured to download all of the transaction information such that the information can be accessed at any period of time.

Figure 2:
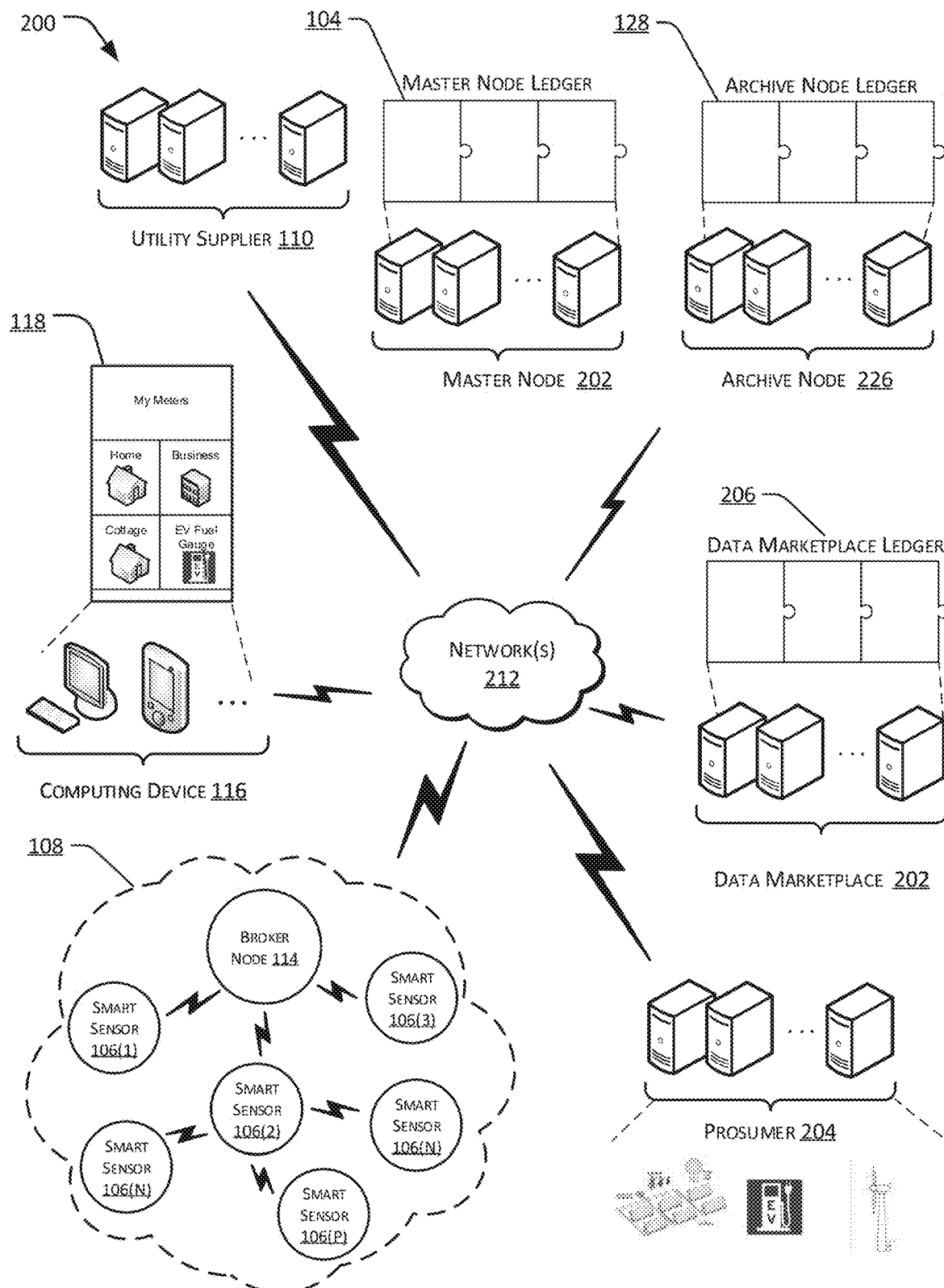
FIG. 2 is schematic diagram of another example architecture including a master node usable to facilitate a transaction on a distributed ledger associated with one or more smart utility meters, smart sensors, or other network computing devices.

FIG. 2 is a diagram illustrating another example networked environment or architecture 200, illustrating the use of a data marketplace 202 and a prosumer 204. Like the architecture 100 of FIG. 1, architecture 200 includes the master node 102 storing the distributed ledger 104 that may be utilized to record transaction information involving smart sensors 106. Additionally, the architecture 200 includes the utility supplier 110, the broker node 114 the archive node 126, and the computing device 116, as they are described above.

The inherent security and privacy of a private distributed ledger (i.e., dissociation of private information from user/customer identities, as discussed above) enables monetization of collected data without impacting the user/customer's privacy. For instance, the smart sensor 106(P) of the autonomous routing area 108 may include a data collector or a statistic node utilized to aggregate data associated with the autonomous routing area 108 or another autonomous routing area 108(N). The smart sensor 106(P) may transmit the aggregated data to the data marketplace 202, which may store a distributed ledger 206. Distributed ledger 206 may act as an archive node in that it stores all of the transaction information for all of the smart sensors 106 without deleting any information. Data customers (e.g., any entity that may find the aggregated data valuable) may interact with the data market place 202 to purchase sets of aggregated data (e.g., consumption data) by specific topics of interest. For instance, the aggregated data may be consumption data organized by all meters in a residential rate class or consumption data organized by all participants in a targeted incentive. These data transactions may be performed via the distributed ledger 104. Additionally, users/consumers may be asked if they wish to participate in sharing consumption data and may be compensated for doing so (e.g., receiving a credit on their utility meter or receiving a credit toward their utility bill). Different data customers may have different permissions and may be allowed to access different types of data. For instance, third-parties may only be able to access deidentified data or may not be able to access certain types of data entirely. A utility company, (e.g., utility supplier 110) may retain full command/control and visibility of the data, a utility regulator may have full visibility to data, but no control over the system. An account holder may only have access and visibility to the account holders associated accounts. A carbon market may only have access and visibility to carbon cryptocurrency transactions. A settlement consortium may have access and visibility to settlement activities (e.g., gas day take, Independent System Operator (ISO), etc.)

Still referring to FIG. 2, the architecture 200 may include a prosumer 204 that generates a resource, such as electricity, and provides the resource for purchase by a consumer and/or by the utility supplier 110. For instance, the prosumer 204 may operate a wind farm, a solar panel farm, or any other method to harvest energy. The prosumer may provide the resource to the utility supplier 110 (e.g., put electricity back on to the electrical grid) or a consumer in exchange for currency (e.g., cryptocurrency, fiat, token, etc.). In one example, the prosumer 204 may be associated with the smart sensor 106, and in exchange for providing the resource to the utility supplier 110, the utility supplier 110 may add currency to the balance of the smart sensor 106 associated with the prosumer 204 via the distributed ledger 104. In another example, the prosumer 204 may provide electric vehicle (EV) charging stations at a premise associated with the prosumer 204. The EV charging stations may be powered by the energy harvested by the prosumer 204 and may be available for public use. Consumers may charge a vehicle at the prosumer 204 EV charging stations and may compensate the prosumer 204 by providing currency to the smart sensor 106 associated with prosumer 204 via the distributed ledger 104.

Example Tiered Architecture

Figure 3:
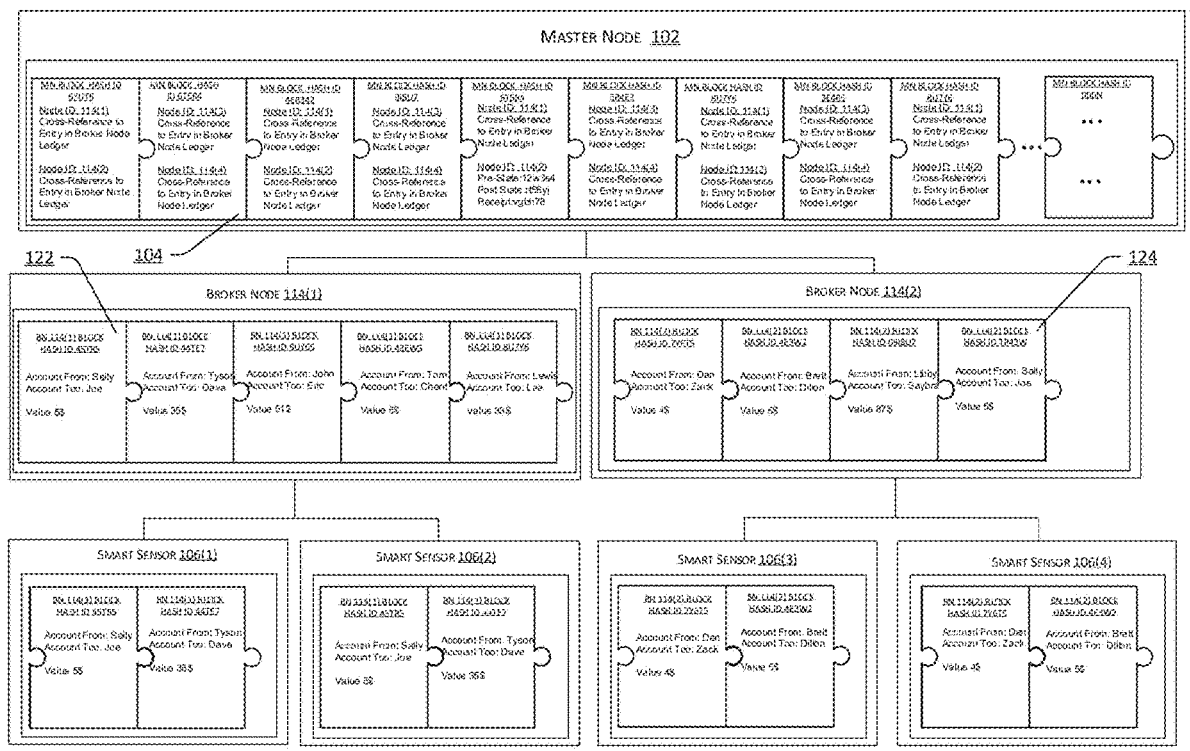
FIG. 3 is a schematic diagram of a tiered architecture.

FIG. 3 illustrates an example tiered architecture. As discussed above, the master node 102 may be a digest or index of cross-references to entries in the various blockchains of the broker nodes 114. The blocks in the distributed ledger 104 may contain a hash ID (e.g., MN Block Hash ID 67UT6), address information (e.g., node ID 114(1) of the broker node 114(1) and node ID 114(2) of the broker node 114(2)), pre-state ID (e.g., the state of the broker node 114(1) or the broker node 114(2) before a transaction is applied), post state ID (e.g., the state of the broker node 114(1) or the broker node 114(2) after a transaction is applied), and a receipt ID (e.g. a confirmation indicator that the transaction was applied). When a user accesses the master node to initiate a transaction, the master node may access the distributed ledger 104 to determine an address of the broker node 114 associated with the smart sensor 106 in which the transaction is to be applied. Once the address is determined and account states are verified, the master node 102 may send the transaction to the respective broker node 114. In examples in which a transaction includes a payment and the sending account lacks sufficient balance to make the payment, the transaction may fail, with all account states remaining unchanged. As shown in FIG. 3, the broker node 114(1) may store a distributed ledger 122 that is associated with the smart sensors 106 that are within its autonomous routing area 108 (i.e., smart sensor 106(1) and 106(2)) and the broker node 114(2) may store a distributed ledger 124 that is associated with the smart sensors 106 that are within its autonomous routing area 108(N) (i.e., smart sensor 106(3) and 106(4)). The distributed ledger 122 and the distributed ledger 124 may comprise transaction ledgers including transactions associated with the broker nodes 114(1) and 114(2) and any smart sensors 106 in communication with the respective broker node. Each block of a transaction ledger may include an account from, an account to, a value, and a hash ID. Each of the exampled blocks in the distributed ledger 122 and the distributed ledger 124 show a transaction between two people and a dollar value. However, as discussed above, a transaction may include adding or adjusting a rate contract for the smart sensors 106, adding or adjusting meter configuration data for the smart sensors 106, and/or transferring funds from an account associated with a user to update a balance associated the smart sensors 106. As the smart sensors 106 communicate with their respective broker node 114, the smart sensors 106 may determine that the information written on the distributed ledger of the broker node 114 includes information that is relevant to itself. If so, then the smart sensor may add the information to the distributed ledger that is local to the smart sensor 106 and perform an action based on the information (e.g. adjust a rate contract, change meter configurations, add value to a balance, etc.). Although the smart sensors 106 shown in FIG. 3 each show a distributed ledger being stored on the smart sensors 106, in some instances, the smart sensors 106 may not store the distributed ledger. Rather, when the smart sensors 106 communicate with their respective broker node 114 and determine that the information written on the distributed ledger of the broker node 114 includes information that is relevant to itself, the smart sensors may perform an action based on the information written on the distributed ledger at the broker node level without storing any information on a distributed ledger at the smart sensor level.

Example Master Node

Figure 4:
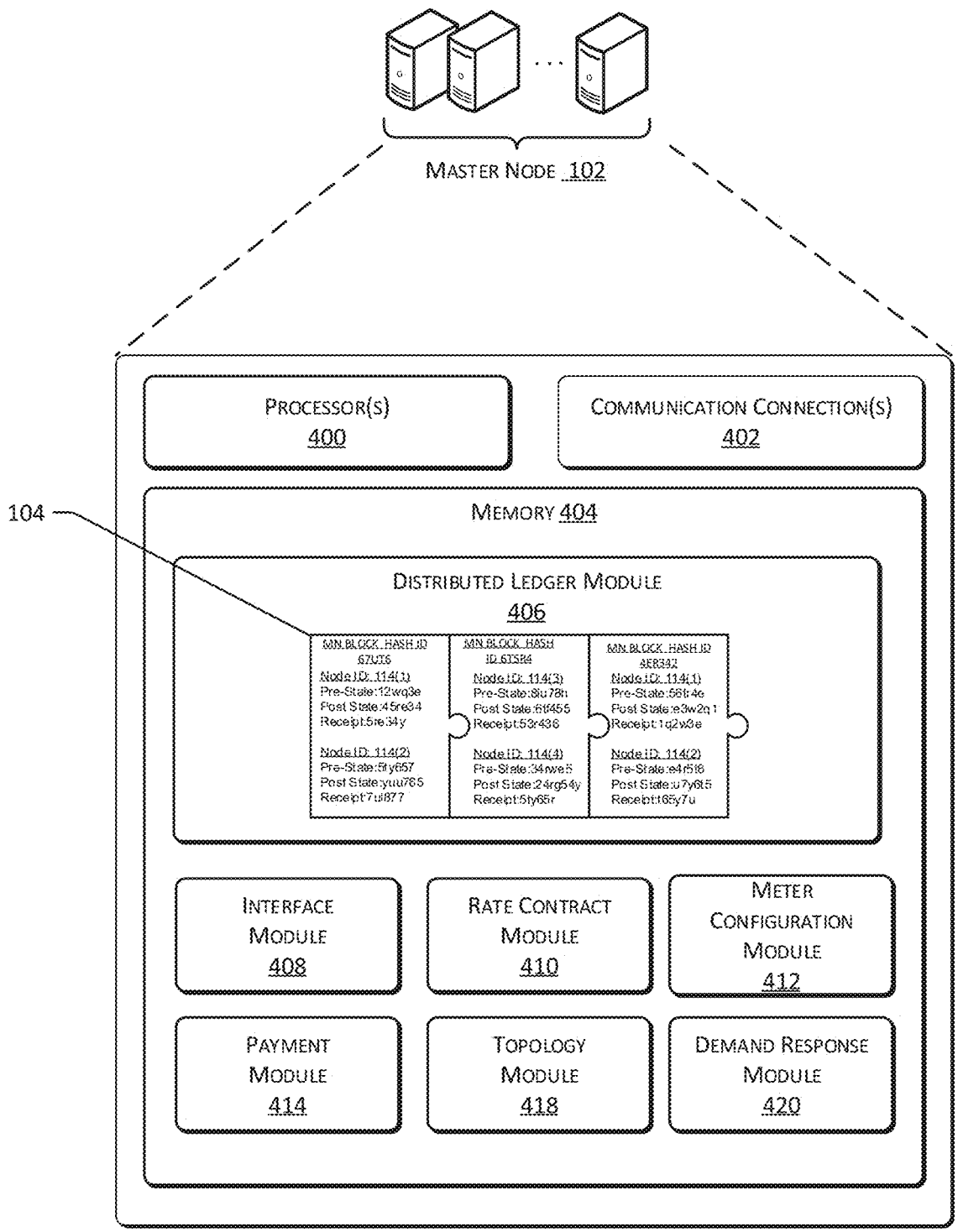
FIG. 4 is a block diagram illustrating details of the example master node of FIG. 1.

FIG. 4 illustrates an example master node 102 of FIG. 1 in more detail. The master node 102 may be configured as or disposed at a server, a cluster of servers, a server farm, a data center, a cloud computing resource, or any other computing resource capable of storing and/or providing access to a distributed ledger, such as distributed ledger 104. The master node 102 may include one or more processors 400, one or more communication connections 402, and memory 404. The memory 404 may include a plurality of modules to implement various functions of the master node 102. For instance, a distributed ledger module 406 may store the distributed ledger 104 that may be utilized to receive transactions involving one or more smart sensors 106. The distributed ledger module 406 of the master node 102 may record transaction information that pertains to all of the broker nodes 114 and all of the smart sensors 106 that are within the given utility network of the master node 102. The distributed ledger 104 may be a digest or index of cross-references to entries in the various blockchains of the broker nodes 114. For instance, if the master node 102 receives a request to perform a transaction on of the smart sensors 106, then the master node 102 may access the distributed ledger 104 to determine an address of the correct broker node 114 that is associated with the respective smart sensor 106, and then provide the transaction information to the respective broker node 114. In some cases, for redundancy purposes in case of missing or deleted data, the distributed ledger module 406 of the master node 102 may record transaction information that pertains to other broker nodes and smart sensors that are not within the utility network associate with the master node 102.

As an example to illustrate how a block is formed on a Proof-of-Work type blockchain for a rate contract, a user desiring to apply a new rate contract to a smart sensor 106 may use software to create a new transaction by entering conditions of the rate contract and the address of the recipient (e.g., the smart sensor 106 identification information) and transmitting this information to the distributed ledger 104 as a transaction that hasn't yet been recorded in a block of the blockchain (i.e., an "un-blocked transaction"). Since the distributed ledger 104 includes multiple computers, when the user sends the un-blocked transaction to the distributed ledger 104, one of the multiple computers receives the un-blocked transaction and shares it with others of the multiple computers until the transaction request has been substantially distributed throughout the distributed ledger 104.

Some of the multiple computers making up the distributed ledger 104 are "miners" that create new blocks from un-blocked transactions. A miner computer receives un-blocked transactions and verifies the un-blocked transactions by determining that each un-blocked transaction accords with the blockchain scheme (e.g., the un-blocked transaction includes valid signature(s), a sum of output(s) of the un-blocked transaction is no greater than the sum of input(s), etc.). Once the miner computer verifies enough un-blocked transactions to meet the block size, the miner has identified a potential block that could be added to the blockchain. In order for this block to be added to the blockchain, according to the blockchain scheme the miner must first generate a hash of the block concatenated to the blockchain that accords with a criterion specified by the blockchain scheme. In many blockchain schemes, this criterion includes a number of zeros that the hash must start with. Note that this is why the blocks are represented as puzzle pieces in the figures—the hash function is applied to all the former blocks of the blockchain with the potential block concatenated at the end of the chain. Therefore, the hash generated is an encryption of the entire blockchain plus the potential block.

For example, the miner applies a hash function (e.g., SHA-256) to the potential block concatenated to the former blocks to generate a hash until the hash starts with a minimum number of zeros (i.e., the hash is a small number, e.g., a hash that starts with 72 zeros)). These hashes are generated randomly, so the miner repeatedly reattempts to generate a hash that meets the hash criterion until the miner generates a hash that meets the hash criterion or until another miner generates a hash that meets the hash criterion, in which case the miner will start the process over.

When a miner finds a hash that accords with the hash criterion, the miner transmits an announcement to other miners of the distributed ledger 104 that the miner found a hash for the potential block. The other computers that receive the announcement check to make sure that the hash value accords with the hash criterion and that transactions of the potential block are valid (e.g., the un-blocked transaction includes valid signature(s), a sum of output(s) of the un-blocked transaction is no greater than the sum of input(s), etc.). So long as these conditions are met, the other computers add the potential block to the distributed ledger 104 as the next block of the distributed ledger 104 and continue adding blocks per this scheme. Therefore, the hash reflects the entire chain of blocks that have been accepted by the multiple computers of the distributed ledger 104. This level of encryption associated with the distributed ledger 104, and blockchains in general, allows for more enhanced security of user/customer private information by dissociation of the private information from user/customer identities. The blocks are depicted as puzzle pieces to represent the encryption of a block being based on the encryption of the previous blocks. The distributed ledger 104 includes blocks that each record transaction information conducted via the blockchain. The transaction information may include information related to an activity instruction that, when received by the smart sensor 106, may cause the smart sensor 106 to perform an action. An activity instruction may include a rate contract, meter configuration data, payment information, demand response instructions, etc.

In some examples, the distributed ledger 104 may not implement a Proof-of-Work type scheme in order to add a new block. Rather, the distributed ledger 104 may implement a Proof-of-Authority type scheme in which one or more broker nodes 114 may act as sealers that are authorized by a system administrator to create blocks. These sealers may reach a consensus amongst themselves necessary to create blocks. A Proof-of-Authority scheme may be more secure (since an attacker with unwanted connection or hacked authority cannot overwhelm a network potentially reverting all transactions), may be less computationally intensive (mining with difficulty as a security method requires lots of computation), may be more performant (Proof-of-Authority consensus provides lower transaction acceptance latency) and may be more predictable (blocks are issued at steady time intervals). The sealers in the Proof-of-Authority type scheme may be allowed to create blocks at any time or may be configured to create blocks during a fixed interval of time. In some examples, each broker node 114 of the networked environment or architecture 100 may comprise a sealer. In some examples, less than all of the broker nodes 114 may comprise a sealer.

An interface module 408 may be configured to generate a graphical user interface (e.g., interface 118) presenting the transaction options that are available. The interface module 408 may make the interface available to one or more users by, for example, publishing the interface to a website accessible by a browser of a client computing device. When accessed by the computing device, the interface module 408 may serve the interface to the computing device displaying the transactions that are available along with controls usable to request the transactions.

A rate contract module 410 may be configured to enable rate contract transaction information to be written to the distributed ledger 104. For instance, the master node 102 may receive a request from the utility supplier 110 to upload a new rate contract or reassign one or more of the smart sensors 106 to refer to a different contract in the future. The rate contract may specify an identifier for each of the smart sensors 106 on which the rate contract applies, a type of each of the smart sensors 106 on which the rate contract applies, a bill rate based on a time of day, a bill rate based on a forward consumption of a resource, a bill rate based on a reverse consumption of a resource, a bill rate based on a peak demand, a bill rate based on a power factor, a bill rate based on a class of customer, and/or a bill rate based on a type of payee. Once the master node 102 receives a new rate contract publication or a rate contract reassignment for one or more smart sensors 106, the master node 102 may add the new contract to the distributed ledger 104 by sealing it into a block. Once the contract is published, the master node 102 may determine all targeted smart sensor 106 addresses and published transactions to all broker nodes 114 that are associated with the respective smart sensors 106. The broker node 114 may then seal the rate contract into a local sub-chain block, and issue command transactions to all smart sensors 106 for which a rate contract change applies. At a configurable time interval, the smart sensor 106 may interrogate its internal metrology registers and invoke a payment function specified in the rate contract. The smart sensor 106 may then gossip its transaction to its peers, eventually reaching the broker node 114 to be sealed into a block. In embodiments where the smart sensor 106 does not store local blockchain data, the smart sensor 106 may transmit its billing data to the broker node 114, which may call a payable function in the rate contract, which may have distinct address. The master node 102 may receive a transmission from the broker node 114 confirming that the information was received (e.g., a receipt) and the master node 102 may add a new block to the distributed ledger 104 that indicates the status of the broker node 114.

A meter configuration module 412 may be configured to enable meter configuration transaction information to be written to the distributed ledger 104. For instance, the master node 102 may receive a request from the utility supplier 110 to upload new meter configuration data or an adjustment to existing meter configuration data currently being utilized by one of the smart sensors 106. The request may specify an identifier for each of the smart sensors 106 on which the meter configuration data applies, a type of each of the smart sensors 106 on which the meter configuration data applies, a software update on the smart sensors 106, a channel hopping sequence, a data rate used by the smart sensors 106, a signal strength used by the smart sensors 106, and/or a communication protocol used by the smart sensors 106. In some examples, the request may specify which smart sensors 106 by invoking a function in a meter configuration contract such that the information in the request is applied by the meter configuration contract to the smart sensors 106 that are associated with the meter configuration contract. This configuration is advantageous when managing many meters having the same configuration scheme. Once the master node 102 receives a meter configuration transaction request, the master node 102 may access the distributed ledger 104 to determine an address of the correct broker node 114 that is associated with the respective smart sensor 106, and then provide the meter configuration transaction information to the respective broker node 114. The master node 102 may receive a transmission from the broker node 114 confirming that the information was received (e.g., a receipt) and the master node 102 may add a new block to the distributed ledger 104 that indicates the status of the broker node 114.

A payment module 414 may be configured to enable payment transaction information to be written to the distributed ledger 104. For instance, the master node 102 may receive a request from a computing device 116 (e.g., a device associated with a customer) via a payment application or website in communication with the master node 102 to transfer funds into a balance associated with the smart sensor 106. The request may specify an identifier of the smart sensor 106 on which the funds are to be applied and/or an amount of funds to be applied. The funds may be in the form of a currency such as a cryptocurrency, fiat, a token, etc. Once the master node 102 receives a payment transaction request, the master node 102 may access the distributed ledger 104 to determine an address of the correct broker node 114 that is associated with the respective smart sensor 106 (e.g., access a digest or index of cross-references to entries in the various blockchains of the broker nodes 114), and then provide the payment transaction information to the respective broker node 114. The master node 102 may receive a transmission from the broker node 114 confirming that the information was received (e.g., a receipt) and the master node 102 may add a new block to the distributed ledger 104 that indicates the status of the broker node 114.

A demand response module 420 may be configured to enable the utility supplier 110 to initiate a demand response event. For instance, the master node 102 may prompt a consumer of a resource (e.g. via computing device 116) to participate in a demand response event. The prompt may be in the form of a text message, email, automated phone call, etc. The prompt may also include an incentive to participate in the demand response event, such as a credit towards a balance associated with the smart sensor 106 of the customer. If the master node 102 receives confirmation from the user to participate in the demand response event (e.g., by responding to the prompt, sending a text, accessing an app on the user's computing device, etc.), then the master node 102 may update the distributed ledger 104 (e.g., add a new block) to indicate that the user has made a pledge to participate in the demand response event. In response to the master node 102 receiving an instruction to perform a demand response event, the master node 102 may update the distributed ledger 104 (e.g., add a new block) to indicate that the demand response event has been initiated. The master node 102 may then transmit a signal to the broker node 114 causing the broker node 114 to update the distributed ledger 122 that is local to the broker node 114 to reflect that the demand response event has been initiated. Additionally, or alternatively, the master node 102 may send a transmission directly to the consumer (e.g., via computing device 116) indicating that the demand response event has been initiated and instructing the consumer to turn off one or more loads. The demand response module 420 may determine if the consumer turned off the one or more loads (i.e., if the consumer fulfilled the pledge) and the master node 102 may credit a balance associated with the smart sensor 106 of the customer. The master node 102 may add a new block to the distributed ledger 104 that includes the transaction information (i.e., the credit to the balance). The master node 102 may then transmit a signal to the broker node 114 causing the broker node 114 to update the distributed ledger 122 that is local to the broker node 114 to reflect the transaction information.

Additionally, or alternatively, if the master node 102 has access to information about the devices in the utility communication network, it may make compatibility and/or verification determinations of the meter configuration requests and/or the rate contract requests prior to presenting the available transactions to the user. For instance, the memory 404 may store a topology module 418 that is in communication with the utility supplier 110. The topology module 418 may maintain information about the device types, current software versions, and/or locations of devices in the utility supplier's communication network. Alternatively, the memory 404 may maintain a record of all device types for which the user has previously made transactions with. In either case, the user may be presented only with transactions that are compatible with devices in the utility's own communication network.

The master node 102 also includes one or more communication connections 402 to enable the master node 102 to communicate with other computing devices locally or over the network 112. Examples of communication connections include, without limitation, power line communication (PLC) connections, Ethernet or other wired network connections, cellular communication connections, RF communication connections, or the like. As such, the utility master node 102 also includes any ancillary hardware, modules, and/or interfaces associated with or needed for the operation of the particular communication connections.

Example Broker Node

Figure 5:
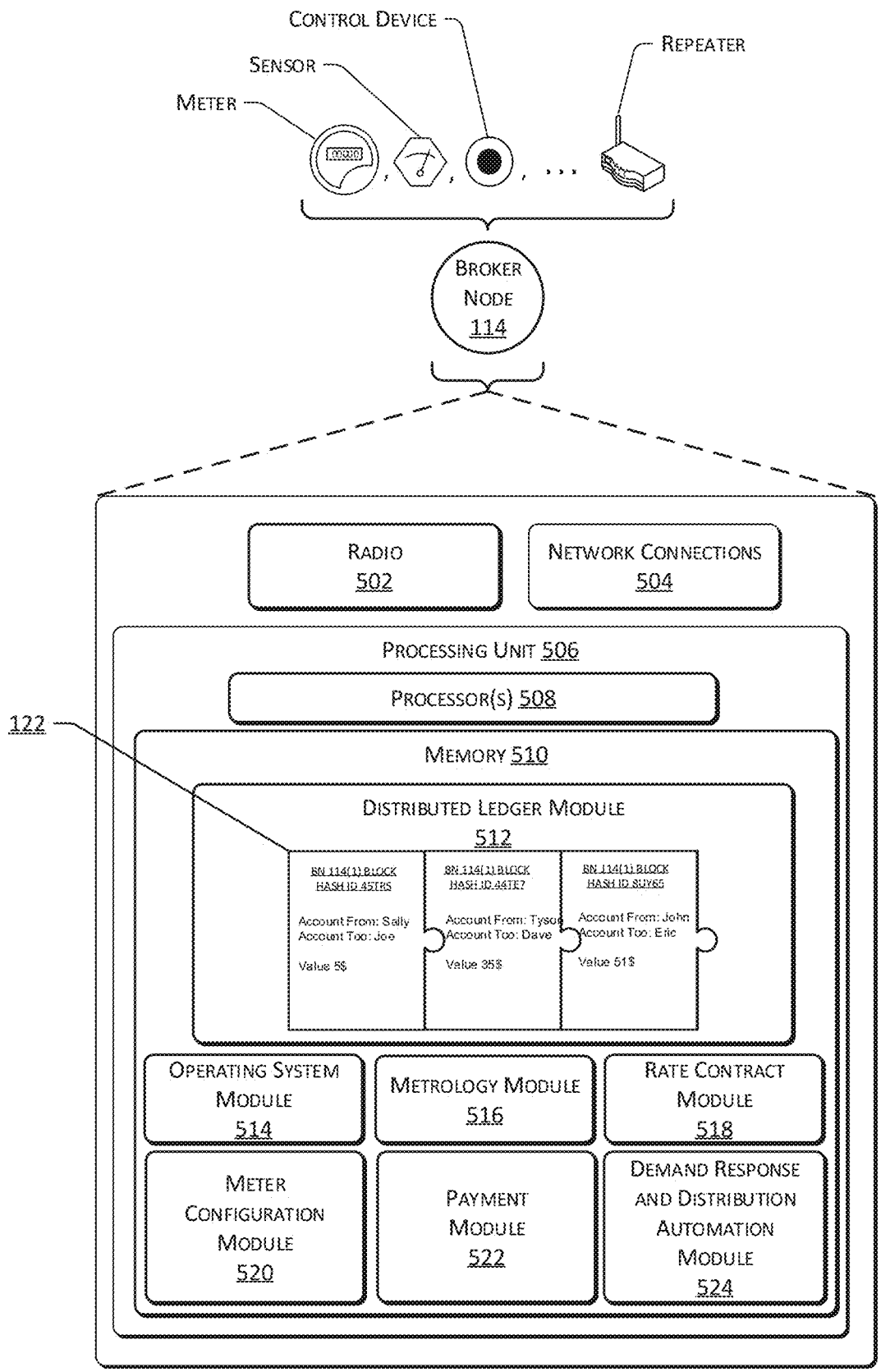
FIG. 5 is a block diagram illustrating details of the example broker node of FIG. 1.

FIG. 5 is a diagram showing example details of an individual broker node 114. As discussed above, the broker node may comprise a smart sensor (e.g., electricity meter, water meter, or gas meter), a relay, a repeater, a smart grid router, a transformer, a shard node, or any other utility network computing device. The broker node 114 may be configured for interaction with the master node 102, the utility supplier 110, the computing device 116, the data marketplace 202, the prosumer 204, as well as potentially other computing devices (e.g., consumer computing devices, utility network computing devices, web services, and the like).

As shown in the example of FIG. 5, the broker node 114 may include a radio 502, network connections 504, and a processing unit 506. The radio 502 may provide two-way RF communication with other broker nodes 114 and/or smart sensors 106 in the autonomous routing area 108 and/or other computing devices via the network 112. The processing unit 506 may include one or more processors 508 and memory 510 and/or other hardware device(s), such as an application specific integrated circuit (ASIC), a gate array or other hardware-based logic device. The memory 510 may include an operating system (OS) 514 and a distributed ledger module 512 that may store the distributed ledger 122 to be utilized to record transactions involving one or more utility meters or other smart sensors 106 that are within the respective autonomous routing area 108 of the broker node 114. The distributed ledger 122 may comprise a transaction ledger in which each block contains transaction information related to the respective smart sensors associated with the broker node 114. Each block of a transaction ledger may include an account from, an account to, a value, and a hash ID, for example. However, additional or alternative information may be included in transactions written to the ledger. Each of the example blocks in the distributed ledger 122 show a transaction between two people and a dollar value. However, as discussed above, a transaction may include adding or adjusting a rate contract for the smart sensors 106, adding or adjusting meter configuration data for the smart sensors 106, transferring funds from an account associated with a user to update a balance associated the smart sensors 106, and/or other information. In some cases, for redundancy purposes in case of missing or deleted data, the distributed ledger module 512 of the broker node 114 may record transactions that pertain to other smart sensors that are not within the autonomous routing area 108 that is associated with the broker node 114. As described above with respect to the distributed ledger 104, the distributed ledger 122 of the broker node 114 may add blocks in some cases when the broker node 114 acts as a sealer.

In embodiments in which the broker node 114 comprises a utility meter, the broker node 114 may include a metrology module 516 configured to receive consumption data of a resource (e.g., electricity, water, or gas) at a site of the meter. The metrology module 516 may report the consumption data to the utility supplier 110 by RF transmission via the radio 502. The consumption data may be formatted and/or packetized in a manner or protocol for transmission over the utility communication network.

In embodiments in which the broker node 114 comprises a utility meter, a rate contract module 518 may be configured to store a rate contract associated with the broker node 114 and to receive updates to the rate contract from the master node 102. For instance, the broker node 114 may receive transaction details regarding a rate contract that may cause the distributed ledger module 512 to add a block containing an update to a rate contract stored in the rate contract module 518 or containing a new rate contract. In response, the broker node 114 may apply the new rules of the new and/or updated rate contract via the rate contract module 518. The rate contract may specify an identifier of the broker node 114, a type of the broker node 114, a bill rate based on a time of day, a bill rate based on a forward consumption of a resource, a bill rate based on a reverse consumption of a resource, a bill rate based on a peak demand, a bill rate based on a power factor, a bill rate based on a class of customer, and/or a bill rate based on a type of payee. Alternatively, the rate contract may specify one of the smart sensors 106 within autonomous routing area 108 and the broker node may send a transmission to the specified smart sensor 106 indicating that a new block has been added to the distributed ledger 122.

In embodiments in which the broker node 114 comprises a utility meter, a meter configuration module 520 may be configured to store meter configuration data associated with the broker node 114 and to receive meter configuration transaction information from the master node 102. For instance, the broker node 114 may receive transaction details regarding meter configuration data that may cause the distributed ledger module 512 to add a block containing an update to the meter configuration data stored in the rate configuration module 520. In response, the broker node 114 may apply the meter configurations via the meter configuration module 520. The meter configurations may specify an identifier of the broker node 114, a type of the broker node 114, a software update, a channel hopping sequence, a data rate, a signal strength, and/or a communication protocol. Alternatively, the meter configuration data may specify one of the smart sensors 106 within autonomous routing area 108 and the broker node 114 may send a transmission to the specified smart sensor 106 indicating that a new block has been added to the distributed ledger 122.

In embodiments in which the broker node 114 comprises a utility meter, a payment module 522 may be configured to perform payment transactions and store a balance associated with the broker node 114. For instance, the broker node 114 may receive payment transaction information from the master node 102 causing the broker node 114 to add a block to the distributed ledger 122 containing a payment transaction. The payment transaction may include a transfer of funds into the balance associated with the broker node 114. In response, the broker node 114 may apply the funds to the balance via the payment module 522. The payment transaction may specify an identifier of the broker node 114 and/or an amount of funds to be applied. The funds may be in the form of a currency such as a cryptocurrency, fiat, a token, etc. Alternatively, the payment transaction may specify one of the smart sensors 106 within autonomous routing area 108 and the broker node may send a transmission to the specified smart sensor 106 indicating that a new block has been added to the distributed ledger 122.

A demand response and distribution automation module 524 may be configured to enable initiation of a demand response or distribution automation event. For instance, the broker node 114 may receive load data from a plurality of smart sensors 106 that are within the autonomous routing area 108. The load data may include disaggregated load information for a plurality of loads that are receiving a resource at a respective site of each smart sensor. The demand response and distribution automation module 524 may catalog the load data and prioritize loads that can be shed. For instance, the demand response and distribution automation module 524 may determine which loads can be turned off without endangering the consumer (e.g., washing machine, dryer, dishwasher, etc.) and which loads may need to be kept on for safety reasons (e.g., heater, air conditioning, water pump, etc.). The broker node 114 may receive a transmission from the master node 102 indicating that a demand response event has been initiated. The transmission may be in the form of a transmission signal, or the transmission may be in the form of an update to the distributed ledger 104. The broker node 114 may then determine which loads of the plurality of loads need to be shed in order to satisfy the demand response requirement. For instance, the demand response may include an amount of resource that the utility supplier 110 requires to be shed. The demand response and distribution automation module 524 may determine which loads to shed in order to meet that amount. In response to the broker node 114 receiving an instruction to perform the demand response event, the broker node 114 may update the distributed ledger 122 (e.g., add a new block) that is local to the broker node 114 to indicate that a demand response event has been initiated. The broker node 114 may then transmit a signal to the one or more smart sensors 106 causing the one or more smart sensors 106 to update an instance of a portion of the distributed ledger 122 that is local to the one or more smart sensors 106 to reflect that the demand response event has been initiated. Additionally, or alternatively, the broker node 114 may send a signal to the one or more smart sensors 106 causing the one or more smart sensors 106 to refrain from providing, or altering an amount of, a resource to the specified loads.

In some examples, the broker node 114 may be configured to receive data (e.g., voltage, current, gas flow, water flow etc.) collected by the smart sensors 106 at a site associated with each smart sensor 106 to determine if the site is experiencing a resource related event. The demand response and distribution automation module 524 may be configured to enable the broker node 114 to operate industrial controls within its autonomous routing area 108. For instance, the demand response and distribution automation module 524 may be configured to use onboard machine learning techniques to monitor and optimize the local circuit to identify power consumption and voltage patterns within its local circuit. In some examples, the demand response and distribution automation module 524 may be configured to autonomously manage voltage levels along the circuit by changing a tap on a multi-tap transformer or dispatching capacitance from a capacitor bank. Acting in concert, the broker nodes 114 may communicate data regarding power quality on their respective local circuits and operate industrial controls to route excess power from one neighbor circuit to another circuit experiencing high demand.

Example Smart Sensor

Figure 6:
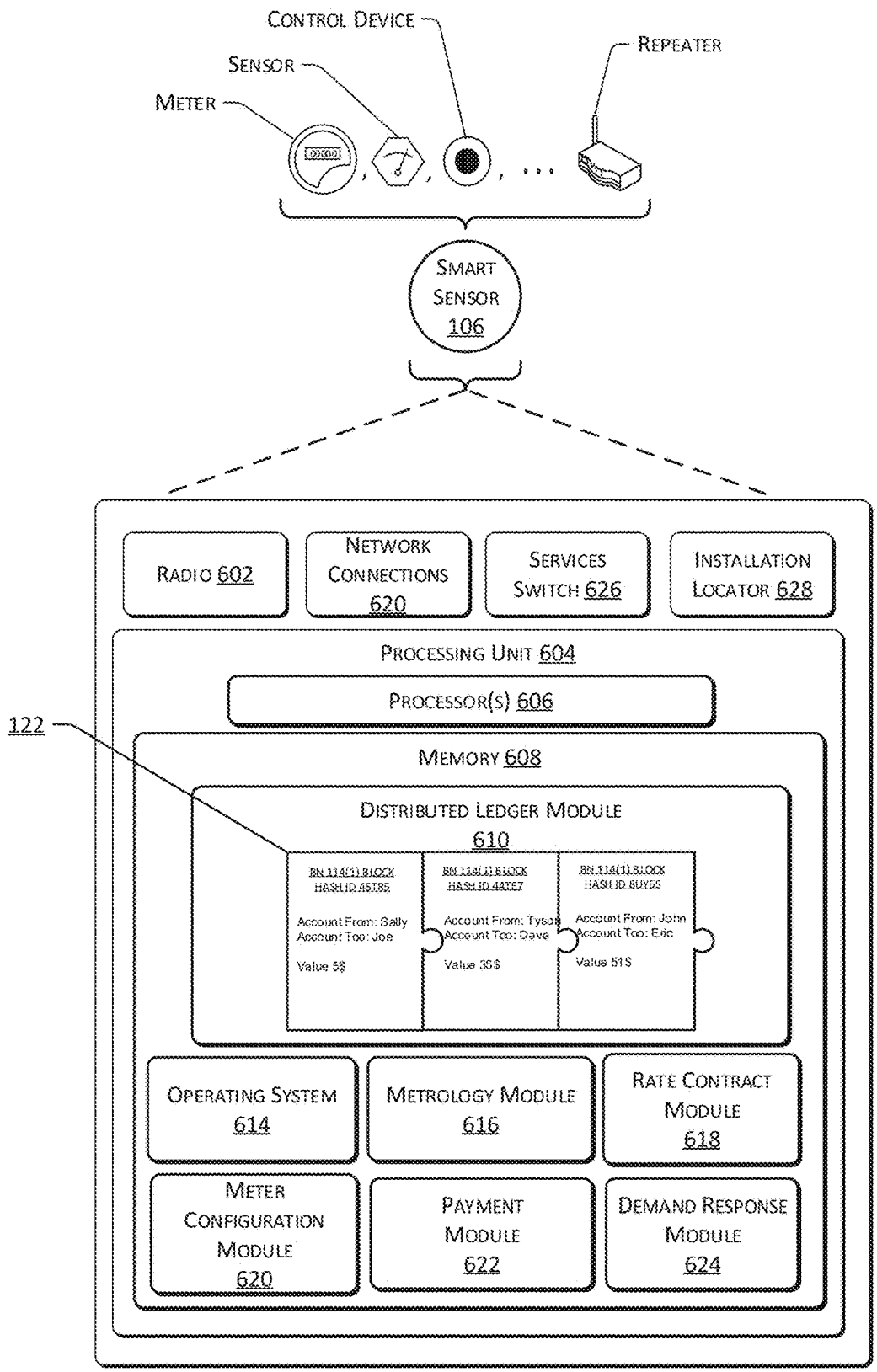
FIG. 6 is a block diagram illustrating details of one of the example smart sensors of FIG. 1.

FIG. 6 is a diagram showing example details of an individual smart sensor 106. As discussed above, the smart sensor may comprise a smart utility meter (e.g., electricity meter, water meter, or gas meter), a relay, a repeater, a smart grid router, a transformer, or any other utility network computing device. The smart sensor 106 may be configured for interaction with the utility master node 102, the utility supplier 110, the computing device 116, the smart sensor 106(P), the data marketplace 202, the prosumer 204, as well as potentially other computing devices (e.g., consumer computing devices, utility network computing devices, web services, and the like). As noted above, in some examples, the smart sensor 106 may comprise a smart utility meter.

The following examples of the smart sensor 106 include some examples in which information is stored in a local instance of a distributed ledger. However, in other examples of the smart sensor 106, the smart sensors 106 may not store a distributed ledger and may simply receive and implement an activity instruction and may send an acknowledgement of certain actions having been performed). As shown in the example of FIG. 6, the smart sensor 106 may include a radio 602, a processing unit 604, a services switch 626, and an installation locator 628. The radio 602 may provide two-way RF communication with other smart sensors 106 or the broker node 114 in the autonomous routing area 108 and/or other computing devices via the network 112. The installation locator 628 may include an RFID tag, as discussed above. The processing unit 604 may include one or more processors 606 and memory 608 and/or other hardware device(s), such as an application specific integrated circuit (ASIC), a gate array or other hardware-based logic device. The memory 608 may include an operating system (OS) 614 and a distributed ledger module 610 that may store a portion of the distributed ledger 122 to be utilized to record transactions involving the smart sensor 106. The distributed ledger module 610 of the smart sensor 106 may record transaction that pertain to the smart sensors 106. In some cases, for redundancy purposes in case of missing or deleted data, the distributed ledger module 610 of the smart sensor 610 may record transactions that pertain to other smart sensors. In either case, the distributed ledger module 610 only stores a portion of the distributed ledger 104 that is stored at the broker node 114. For instance, the smart sensor 106 may periodically receive transmissions from the broker node 114 and the smart sensor 106 may determine if a new block has been added to the distributed ledger 122 that is located at the broker node 114. The distributed ledger module 610 may determine that a new block has been added to the distributed ledger 122 that is located at the broker node 114 and may determine if the block includes any information (e.g., meter identifier, meter type, etc.) that is relevant to the smart sensor 106. If so, the distributed ledger module 610 may update the distributed ledger 122 that is stored on the smart sensor 106. In some instances, the distributed ledger 122 that is stored on the smart sensor 106 is an instance of a portion of the distributed ledger 122 that is stored on the broker node 114, and only contains information from the distributed ledger 122 that is relevant to the sensor 106. In some instances, the portion of the distributed ledger 122 that is local to the smart sensor 106 may also include information that is relevant to one or more neighboring smart sensors 106 (e.g., smart sensors 106 that are located within the autonomous routing area 108 or a neighboring autonomous routing area 108(N)). In some instances, the smart sensor 106 may not store any portion of the distributed ledger 122, but rather, read the information stored in the distributed ledger 122 at the broker node 114 and perform an action based on the activity instruction stored at the broker node level. In this case, the smart sensor 106 may not have the computational capabilities necessary to store any portion of the distributed ledger 122. The smart sensor 106 may periodically check-in with the broker node 114 and determine if any new information has been added to the distributed ledger 122 of the broker node 114. If the smart sensor 106 determines that the distributed ledger 122 of the broker node 114 includes information relevant to itself, then the smart sensor 106 may perform an action based on that information without storing the information as part of a distributed ledger.

In embodiments in which the smart sensor 106 comprises a utility meter, the smart sensor 106 may include a metrology module 616 configured to receive consumption data of a resource (e.g., electricity, water, or gas) at a site of the meter. The metrology module 616 may report the consumption data to the utility supplier 110 by RF transmission via the radio 602. The consumption data may be formatted and/or packetized in a manner or protocol for transmission over the utility communication network.

A rate contract module 618 may be configured to store a rate contract associated with the smart sensor 106 and to receive updates to the rate contract from the broker node 114. For instance, the smart sensor 106 may update the local portion of the distributed ledger 122 with a block containing an update to a rate contract stored in the rate contract module 618 or containing a new rate contract. In response, the smart sensor 106 may apply the new rules of the new and/or updated rate contract via the rate contract module 618. The rate contract may specify an identifier of the smart sensor 106, a type of the smart sensor 106, a bill rate based on a time of day, a bill rate based on a forward consumption of a resource, a bill rate based on a reverse consumption of a resource, a bill rate based on a peak demand, a bill rate based on a power factor, a bill rate based on a class of customer, and/or a bill rate based on a type of payee.

A meter configuration module 620 may be configured to store meter configuration data associated with the smart sensor 106 and to receive updates to the meter configurations from the broker node 114. For instance, the smart sensor 106 may update the local portion of the distributed ledger 122 with a block containing an update to meter configurations stored in the meter configuration module 620 or containing new meter configurations. In response, the smart sensor 106 may apply the meter configurations via the meter configuration module 620. The meter configurations may specify an identifier of the smart sensor 106, a type of the smart sensor 106, a software update, a channel hopping sequence, a data rate, a signal strength, and/or a communication protocol.

A payment module 622 may be configured to perform payments transactions and store a balance associated with the smart sensor 106. For instance, the smart sensor 106 may update the local portion of the distributed ledger 122 with a block containing a payment transaction. The payment transaction may include a transfer of funds into the balance associated with the smart sensor 106. In response, the smart sensor 106 may apply the funds to the balance via the payment module 622. The payment transaction may specify an identifier of the smart sensor 106 and/or an amount of funds to be applied. The funds may be in the form of a currency such as a cryptocurrency, fiat, a token, etc. In some instances, if the balance of the smart sensor 106 falls below a threshold, then the smart sensor 106 may refrain from providing a resource to, or alter an amount of resource provided to, a site associated with the user by disconnecting the services switch 626. In some examples, the smart sensor 106 may be configured to determine a temperature at the site (e.g. via a thermometer (not shown) or via communication to a weather service via network 112) and the smart sensor 106 may continue to provide the resource to the site if the temperature is below or above a predefined threshold.

A demand response module 624 may be configured to enable initiation of a demand response event. For instance, the demand response module 624 of the smart sensor 106 may determine load data that includes disaggregated load information for a plurality of loads that are receiving a resource at a site associated with the smart sensor 106. The smart sensor 106 may provide the load data to the broker node 114. The smart sensor 106 may receive a transmission from the broker node 114 causing the smart sensor to update the instance of the portion of the distributed ledger 122 that is local to the smart sensor 106 to reflect that the demand response event has been initiated. The update may include information detailing which loads of the plurality of loads to refrain from providing the resource too (i.e., shed) and for how long to refrain from providing the resource. In other embodiments, the smart sensor 106 may receive a transmission signal without distributed ledger type information and with the demand response details which may cause the smart sensor 106 to refrain from providing, or altering an amount of, the resource to the one or more loads. In examples in which the smart sensor 106 does contain a local portion of the distributed ledger 122, the smart sensor 106 may update the local portion of the distributed ledger 122 with a block containing information detailing which loads of the one or more loads were shed and for how long the loads were shed.

Example User Interface

Figure 7:
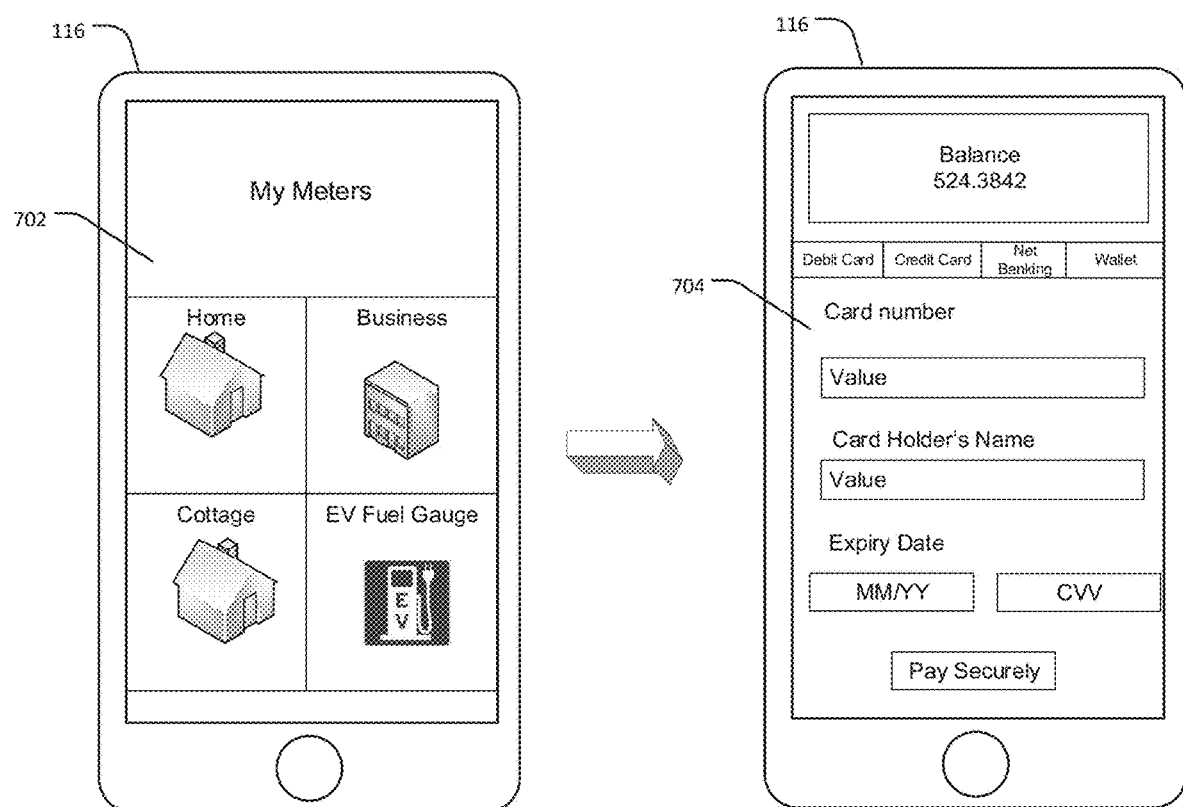
FIG. 7 is a schematic diagram of an example interface of FIG. 1.

FIG. 7 illustrates an example interface that may be presented to a user via the computing device 116 to allow the user to make a payment transaction for a smart sensor 106 that is associated with the user. As shown, when the user selects one of their meters on interface 702, (the left side of FIG. 7), a payment interface 704 is presented (right side of FIG. 7) to allow the user to enter a payment transaction for the selected meter. Although the interface 702 illustrates a home, business, cottage, and EV fuel gauge meter option, any number of combinations or meter types may be presented on interface 702. For instance, interface 702 may display multiple meters that are associated with individual tenants of an apartment building or house. Alternatively, interface 702 may display charitable organizations that a user may be involved with (e.g., a church, a homeless shelter, a soup kitchen, etc.) such that the user may donate currency to a balance of the charitable organizations utility meter. Interface 704 illustrates a payment interface that shows a total balance currently associated with the selected meter and a variety of payment options.

Example Method of Action Performed by Smart Sensor

Figure 8:
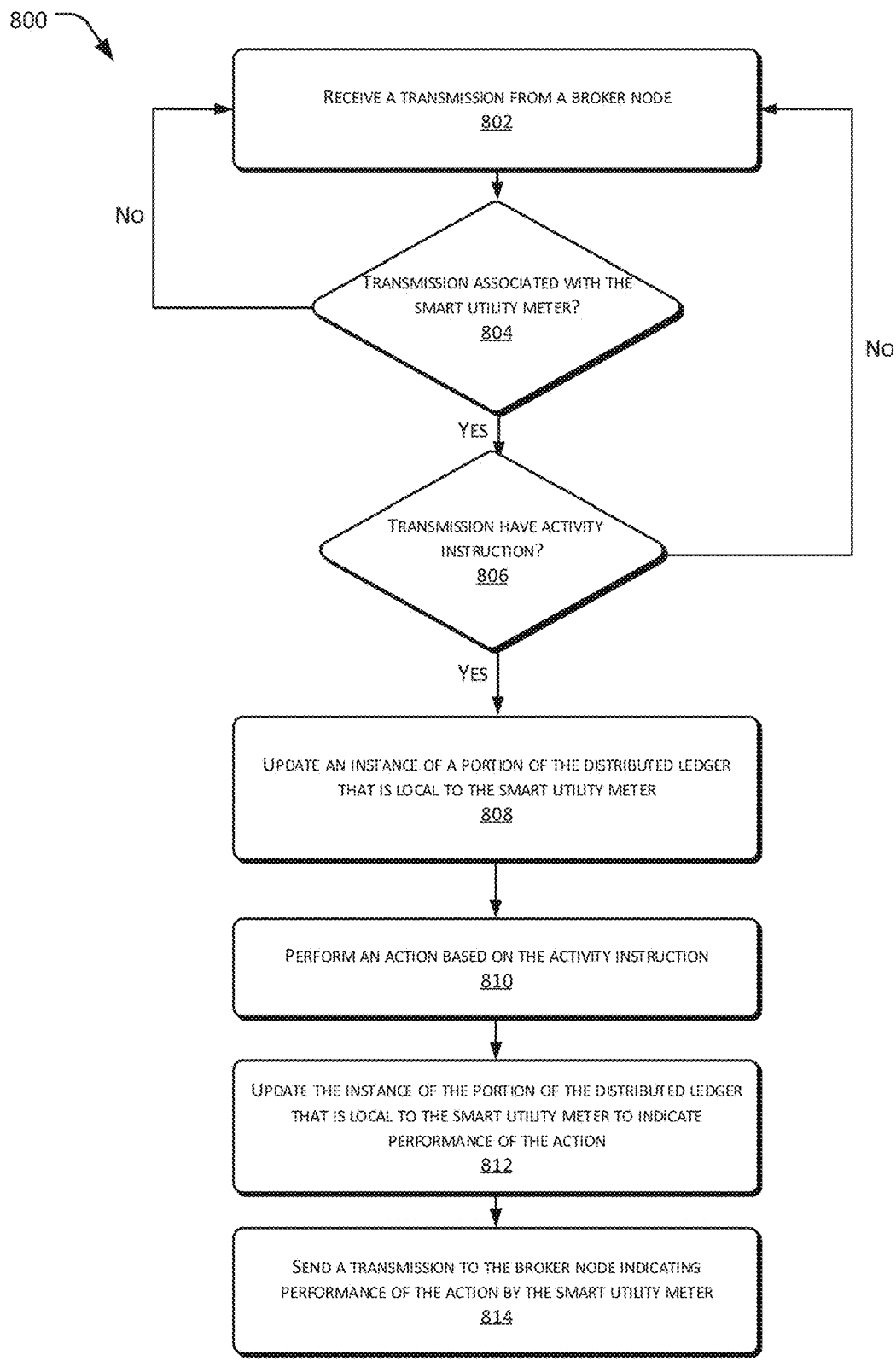
FIG. 8 is a flowchart of an example method that may be implemented by a smart sensor to perform an action.

FIG. 8 is a flowchart which illustrates an example flow of operations 800 that may be performed by a smart sensor to perform an action based on an activity instruction received through a distributed ledger. The example flow of operations 800 is described in the context of the example of architecture 100 and with reference to the devices illustrated in FIG. 1. However, the flow of operations 800 is not limited to use with the architecture 100 and devices of FIG. 1 and may be implemented using other architectures and devices.

The flow of operations 800 may begin, at block 802, with a smart sensor receiving a transmission from a broker node. In some examples, the broker node 114 may periodically communicate with the smart sensor 106 and the smart sensor 106 may determine if a new block has been added to the distributed ledger 122 that is located at the broker node 114 by checking a block ID number of the last block in the distributed ledger 122.

At 804, the smart sensor may determine if the transmission is associated with the smart sensor. In one example, the smart sensor 106 may read meter identifying information and/or meter type information that is located in the new block to determine if the meter identifying information and/or meter type information is relevant to the smart sensor 106. If the new block does not have any information that is relevant to the smart sensor 106, then the process may proceed to block 802. If the new block does have information that is relevant to the smart sensor 106, then the process may proceed to block 806.

At 806, the smart sensor may determine if the transmission contains an activity instruction. In one example, the smart sensor 106 may determine that the new block includes an activity instruction, such as a rate contract transaction, meter configuration transaction, and/or a payment transaction. If the transmission does not include an activity instruction, then the process may proceed to block 802. If the transmission does include an activity instruction, then the process may proceed to block 808.

At 808, the smart sensor may update an instance of a portion of the distributed ledger that is local to the smart sensor. In one example, the smart sensor 106 may update the distributed ledger 122 that is stored on the smart sensor 106 to add the new block containing the activity instruction. In some instances, the distributed ledger 122 that is stored on the smart sensor 106 is an instance of a portion of the distributed ledger 122 that is stored on the broker node 114, and only contains blocks or information from the distributed ledger 122 that are relevant to the sensor 106. In some instances, the portion of the distributed ledger 122 that is local to the smart sensor 106 may also include blocks that are relevant to one or more neighboring smart sensors 106 (e.g., smart sensors 106 that are located within the autonomous routing area 108). In some instances, the smart sensor 106 may not store any portion of the distributed ledger 122, but rather, read the information stored in the distributed ledger 122 at the broker node 114 and perform an action based on the activity instruction stored at the broker node level. The smart sensor 106 may periodically check-in with the broker node 114 and determine if any new information has been added to the distributed ledger 122 of the broker node 114. If the smart sensor 106 determines that the distributed ledger 122 of the broker node 114 includes information relevant to itself, then the smart sensor 106 may perform an action based on that information without storing the information as part of a distributed ledger. In this case, the smart sensor 106 may skip step 808 and proceed directly to step 810 from step 806.

At 810, the smart sensor may perform an action based on the activity instruction. In one example, the smart sensor 106 may perform an action based on the transaction information included in the new block. For instance, if the transaction information includes an update to a rate contract, then the smart sensor 106 may perform an action relating to the rate contract (e.g., adjust a bill rate based on a time of day, adjust a bill rate based on a forward consumption of a resource, adjust a bill rate based on a reverse consumption of a resource, adjust a bill rate based on a peak demand, adjust a bill rate based on a power factor, adjust a bill rate based on a class of customer, and/or adjust a bill rate based on a type of payee).

In some instances, if the transaction information includes an update to meter configuration data, then the smart sensor 106 may perform an action relating to updating a meter configuration (e.g., setting a software update, setting a channel hopping sequence, setting a data rate, setting a signal strength, and/or setting a communication protocol).

In some instances, if the transaction information includes a payment transaction, then the smart sensor 106 may perform an action relating to updating a balance associated with the smart sensor 106. For instance, the payment transaction may include a transfer of funds to the balance associate with the smart sensors 106. The funds may be in the form of a currency, such as a cryptocurrency, fiat, a token, etc.

At 812, the smart sensor may update the instance of the portion of the distributed ledger that is local to the smart sensor to indicate performance of the action. In one example, the smart sensor 106 may add a new block to the portion of the distributed ledger 122 that is local to the smart sensor 106 to indicate that an action was performed based on the rate contract transaction information, the meter configuration transaction information, and/or the payment transaction information.

In some instances, the smart sensor 106 may not store any portion of the distributed ledger 122, and the process 800 may proceed to step 814 from step 810 and skip step 812.

At 814, the smart sensor may send a transmission to the broker node indicating performance of the action by the smart sensor. In one example, the smart sensor 106 may periodically communicate with the broker node 114 and send a transmission to broker node 114 indicating that the action was performed and/or that a new block was added to the portion of the distributed ledger 122 that is local to the smart sensor 106 (in instances where the smart sensor 106 stores a portion of the distributed ledger 122).

Example Method of Payment Transaction Performed by Smart Sensor

Figure 9:
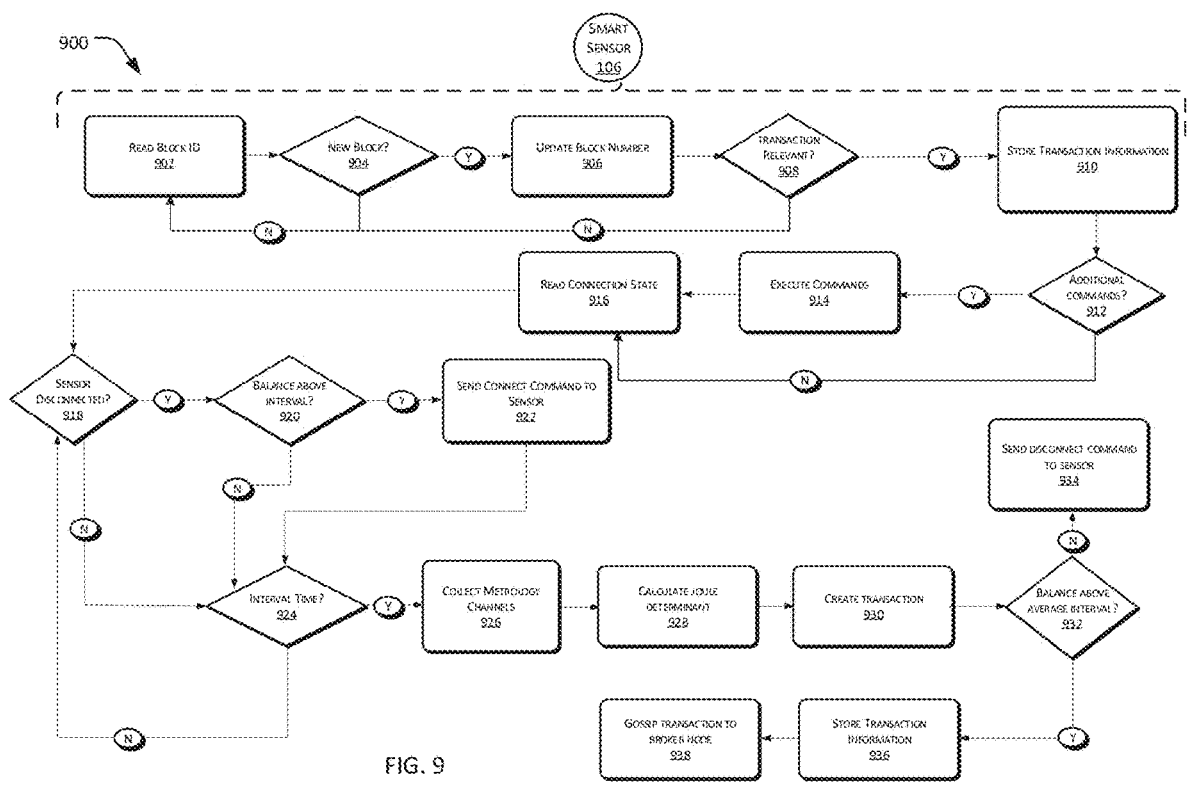
FIG. 9 is a flowchart of an example method that may be implemented by a smart sensor to add to a balance associated with the smart sensor.

FIG. 9 is a flowchart which illustrates a smart sensor, such as smart sensor 106, receiving a payment transaction and causing a resource to be provided to a site based on a balance of funds associated with the smart sensor. At 902, the smart sensor may read a block ID of a broker node. For instance, smart sensor 106 may be in communication with broker node 114 and may read a block ID of a block that is located in the distributed ledger 122 local to the broker node 114.

At 904, the smart sensor may determine if the block is a new block. For instance, the smart sensor 106 may keep a record of block ID's stored in the distributed ledger module 610. If the block does not include a new block ID, then the smart sensor 106 may proceed to 902 (i.e., continue to communicate with the broker node 114). If the new block does contain a new block ID, then the process may proceed to 906.

At 906, the smart sensor may update a block number. For instance, the smart sensor 106 may update the list of block ID's stored in the distributed ledger module 610 to reflect the latest block ID of the distributed ledger 122 local to the broker node 114.

At 908, the smart sensor may determine if a transaction within the new block is relevant to the smart sensor. For instance, the new block may contain a smart sensor identifier or a smart sensor type for which the transaction is directed. If the smart sensor 106 determines that the new block is not relevant, then the process may proceed to 902. If the smart sensor 106 determines that the new block does contain relevant transaction information, then the process may proceed to 910.

At 910, the smart sensor may store the transaction information. For instance, the transaction may be a payment transaction and the smart sensor 106 may update a local portion of the distributed ledger 122 stored at the smart sensor 106 with a block containing a payment transaction. Alternatively, the smart sensor 106 may not contain a distributed ledger and the transaction information may be stored on the memory 608 of the smart sensor 106. The payment transaction may include a transfer of funds into the balance associated with the smart sensor 106. In response, the smart sensor 106 may apply the funds to the balance via the payment module 622. The funds may be in the form of a currency such as a cryptocurrency, fiat, a token, etc.

At 912, the smart sensor may determine if there are any additional commands included in the transaction. If there are no additional commands, then the process may proceed to 916. If there are additional commands, then the process may proceed to 914 in which the commands are executed.

At 916, the smart sensor may determine a connection state. For instance, if the balance was previously below a threshold, then the smart sensor 106 may have been disconnected from providing a resource to a site associated with a user. Alternatively, if the balance was above a threshold, then the smart sensor 106 may have been connected to provide the resource to the site of the user.

At 918, the smart sensor may determine if the smart sensor is disconnected. If the smart sensor is not disconnected, then the process may proceed to 924. If the smart sensor is disconnected, the process may proceed to 920. At 920, the smart sensor determines if a balance is above an average interval. For instance, the smart sensor 106 may determine an average amount of resource consumed over a given time and a cost associated with that amount of resource. If the balance is below the cost associated with the amount of resource over the given interval, then the process may proceed to 924. If the balance is above the cost associated with the amount of resource over the given interval, then the process may proceed to 922.

At 922, the smart sensor may issue a connect command. For instance, the smart sensor 106 may connect the services switch 626 to provide the resource to the site of the user. At 924, the smart sensor may determine if an interval time has expired. For instance, the smart sensor 106 may determine if the interval time associated with the average amount of resource consumed has expired. If the interval time has not expired, then the process may proceed to 918. If the interval time has expired, then the process may proceed to 926.

At 926, the smart sensor may collect metrology channels. For instance, the smart sensor 106 may measure the amount of resource provided to a site while the smart sensor 106 is connected. At 928, the smart sensor may calculate a Joule determinate. For instance, the smart sensor 106 may calculate a cost of the amount of resource provided to the site.

At 930, the smart sensor may create a distributed ledger transaction. For instance, the smart sensor 106 may debit the balance based on the calculated cost of resource consumed. At 932, the smart sensor may again determine if the balance is above the average interval. If the balance is below the average interval, then the process may proceed to 934 and a disconnect command is issued by the smart sensor. If the balance is above the interval, then the process may proceed to 936.

At 936, the smart sensor may store the transaction information. For instance, the smart sensor 106 may create a new block including the transaction information which may be added to the local instance of the distributed ledger 122 that is stored on the smart sensor 106. Alternatively, the smart sensor 106 may not contain a distributed ledger and the transaction information may be stored on the memory 608 of the smart sensor 106. The transaction information may include an amount of resource consumed, a cost of the resource consumed, a type of resource consumed, a location where the resource was provided, a smart sensor identifier, a smart sensor type, a date/time of when the resource was consumed, etc.

At 938, the smart sensor may gossip the transaction information to the broker node. For instance, the smart sensor 106 may transmit data to the broker node 114 indicating that the transaction was performed.

Example Method of Demand Response Performed by Smart Sensor

Figure 10:
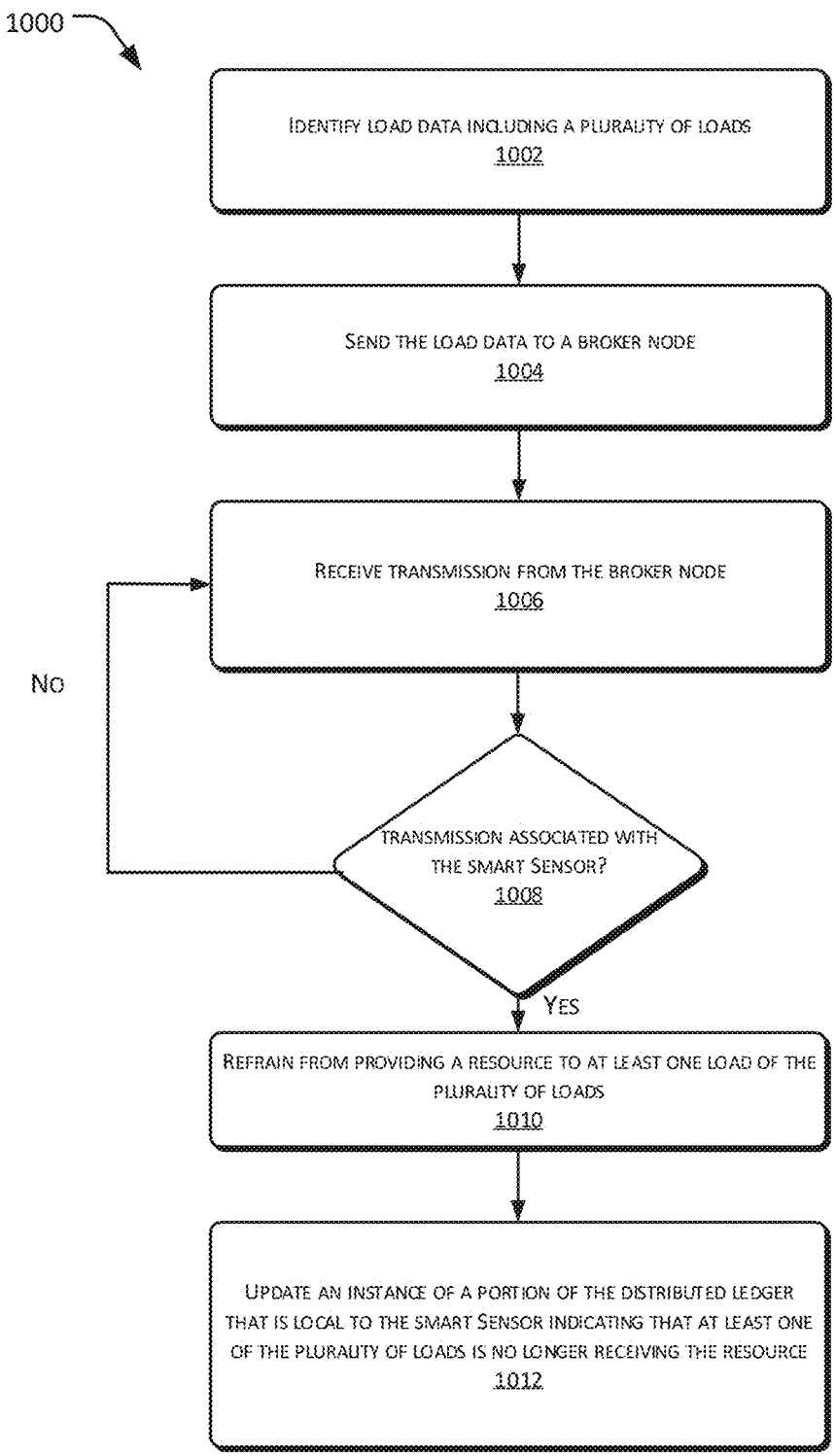
FIG. 10 is a flowchart of an example method that may be implemented by a smart sensor to perform a demand response action.

FIG. 10 is a flowchart which illustrates an example flow of operations 1000 that may be performed by a smart sensor to initiate a demand response event. The example flow of operations 1000 is described in the context of the example of architecture 100 and with reference to the devices illustrated in FIG. 1. However, the flow of operations 1000 is not limited to use with the architecture 100 and devices of FIG. 1 and may be implemented using other architectures and devices.

The flow of operations 1000 may begin, at block 1002, with a smart sensor identifying load data including a plurality of loads. In some examples, the smart sensor 106 may be providing a resource to one or more loads at a site associated with the smart sensor 106. The demand response module 624 of the smart sensor 106 may collect load information and disaggregate the load information such that the demand response module 624 can determine an amount of resource that each load is consuming.

At 1004, the smart sensor may send the load data to a broker node. For example, the smart sensor 106 may send the disaggregated load information to the broker node 114.

At 1006, the smart sensor may receive a transmission from the broker node. For example, the smart sensor 106 may receive a transmission indicating the distributed ledger 122 from the broker node 114 has been updated.

At 1008, the smart sensor may determine if the transmission is associated with the smart sensor. For example, the smart sensor 106 may receive a transmission from the broker node 114 indicating that an update has occurred at the distributed ledger 122 local to the broker node 114. The smart sensor 106 may determine if the update includes any identifying information referring to the smart sensor 106. If the update does include information associated with the smart sensor 106 and the smart sensor 106 stores an instance of a portion of the distributed ledger 122, then the smart sensor 106 may update the instance of the portion of the distributed ledger 122 that is local to the smart sensor 106 to reflect the new block that has been added to the distributed ledger 122 that is local to the broker node 114 and the process may proceed to 1010. In some instances, the smart sensor 106 may not store any portion of the distributed ledger 122, but rather, read the information stored in the distributed ledger 122 at the broker node 114 and perform an action based on the activity instruction stored at the broker node level. If the update does not include information associated with the smart sensor 106, then the process may proceed to 1006.

At 1010, the smart sensor may refrain from providing, or altering an amount of, a resource to at least one load of the plurality of loads. For example, the distributed ledger 104 update may include information detailing which loads of the plurality of loads to refrain from providing the resource too (i.e., shed) and for how long to refrain from providing the resource. In other embodiments, the smart sensor 106 may receive a transmission signal with the demand response details which may cause the smart sensor 106 to refrain from providing, or altering an amount of, the resource to the one or more loads.

At 1012, in examples in which the smart sensor 106 stores an instance of a portion of the distributed ledger 122, the smart sensor may update the instance of the portion of the distributed ledger that is local to the smart sensor indicating that at least one of the plurality of loads is no longer receiving the resource. For instance, the smart sensor 106 may update the local portion of the distributed ledger 122 with a block containing information detailing which loads of the one or more loads were shed and for how long the loads were shed. In examples in which the smart sensor 106 does not store a distributed ledger, the smart sensor 106 may gossip or send a transmission to the broker node detailing which loads of the one or more loads were shed and for how long the loads were shed.

Figure 11:
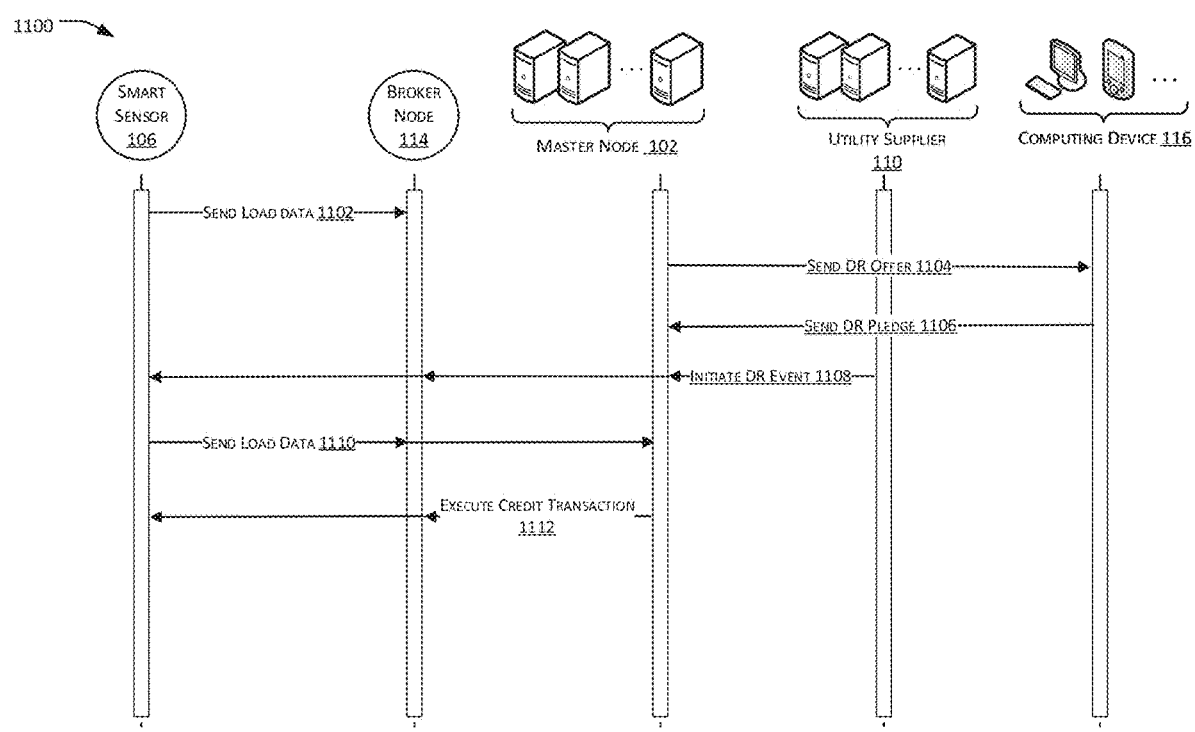
FIG. 11 is a signal flow diagram of an example method that may be implemented by a utility meter or other smart sensor to perform a demand response action.

FIG. 11 is a signal flow diagram which illustrates an example flow of operations that may be used to initiate a demand response event. The example flow of operations 1100 is described in the context of the example of architecture 100 and with reference to the devices illustrated in FIG. 1. However, the flow of operations 1100 is not limited to use with the architecture 100 and devices of FIG. 1 and may be implemented using other architectures and devices.

The flow of operations 1100 may begin at step 1102 with the smart sensor 106 sending load data to the broker node 114. For example, the smart sensor 106 may be providing a resource to one or more loads at a site associated with the smart sensor 106. The demand response module 624 of the smart sensor 106 may collect load information and disaggregate the load information such that the demand response module 624 can determine an amount of resource that each load is consuming. The smart sensor 106 may send the disaggregated load information to the broker node 114.

At 1104, the master node 102 may send a demand response offer to the computing device 116. For instance, the master node 102 may prompt a consumer of a resource (e.g. via computing device 116) to participate in a demand response event. The prompt may be in the form of a text message, email, automated phone call, etc. The prompt may also include an incentive to participate in the demand response event, such as a credit towards a balance associated with a smart sensor of the customer.

At 1106 the computing device 116 may send a demand response pledge to the master node 102. For example, a consumer/user of the computing device 116 may opt into participating in a future demand response event. The consumer/user may specify how much resource or which loads they are willing to shed. If the master node 102 receives confirmation from the user to participate in the demand response event, then the master node may update the distributed ledger 104 (e.g., add a new block) to indicate that the user has made a pledge to participate in the demand response event.

At 1108, the utility supplier may initiate a demand response event. For instance, the utility supplier 110 may send a transmission to the master node 102 causing the master node 102 to initiate the demand response. In response to the master node 102 receiving an instruction to perform a demand response event, the master node 102 may update the distributed ledger 104 (e.g., add a new block) to indicate that a demand response event has been initiated. The master node 102 may then transmit a signal to the broker node 114 causing the broker node 114 to update the distributed ledger 122 that is local to the broker node 114 to reflect that the demand response event has been initiated. The broker node 114 may then determine which loads of the plurality of loads need to be shed in order to satisfy the demand response requirement. For instance, the demand response may include an amount of resource that the utility supplier 110 requires to be shed. The demand response module 524 may determine which loads to shed in order to meet that amount. In response to the broker node 114 receiving an instruction to perform the demand response event, the broker node 114 may the distributed ledger 122 (e.g., add a new block) that is local to the broker node 114 to indicate that a demand response event has been initiated. The broker node 114 may then transmit a signal to the one or more smart sensors 106 causing the one or more smart sensors 106 to, in examples in which the smart sensor includes an instance of a portion of the distribute ledger 122, update the instance of the portion of the distributed ledger 122 that is local to the one or more smart sensors 106 to reflect that the demand response event has been initiated. In other examples, the smart sensor 106 may not contain a distributed ledger and the broker node 114 may send a transmission to the smart sensor 106 causing the smart sensor 106 to perform a demand response action without providing any distributed ledger information. The update may include information detailing which loads of the plurality of loads to refrain from providing the resource too (i.e., shed) and for how long to refrain from providing the resource. In other embodiments, the smart sensor 106 may receive a transmission signal with the demand response details which may cause the smart sensor 106 to refrain from providing the resource to the one or more loads. Additionally, or alternatively, the broker node 114 may send a signal to the one or more smart sensors 106 causing the one or more smart sensors 106 to refrain from providing, or altering an amount of, a resource to the specified loads. Additionally, or alternatively, the master node 102 may send a transmission directly to the consumer (e.g., via computing device 116) indicating that the demand response event has been initiated and instructing the consumer to turn off one or more loads.

At 1110, the smart sensor 106 may send load data to the broker node 114 and to the master node 102. In one example, the smart sensor 106 may update the local portion of the distributed ledger 122 with a block containing information detailing which loads of the one or more loads were shed and for how long the loads were shed. In another example in which the smart sensor 106 does not contain a distributed ledger, the smart sensor 106 may gossip information or send a transmission to the broker node 114 detailing which loads of the one or more loads were shed and for how long the loads were shed.

At 1112 the master node may execute a credit transaction. For example, the demand response module 420 may determine if the consumer turned off the one or more loads (i.e., the consumer fulfilled the pledge) and the master node 102 may credit a balance associated with a smart sensor of the customer. The master node 102 may add a new block to the distributed ledger 104 that includes the transaction information (i.e., the credit to the balance). The master node 102 may then transmit a signal to the broker node 114 causing the broker node 114 to update the distributed ledger 122 that is local to the broker node 114 to reflect the transaction information.

Example Method of Action Performed by Smart sensor

Figure 12:
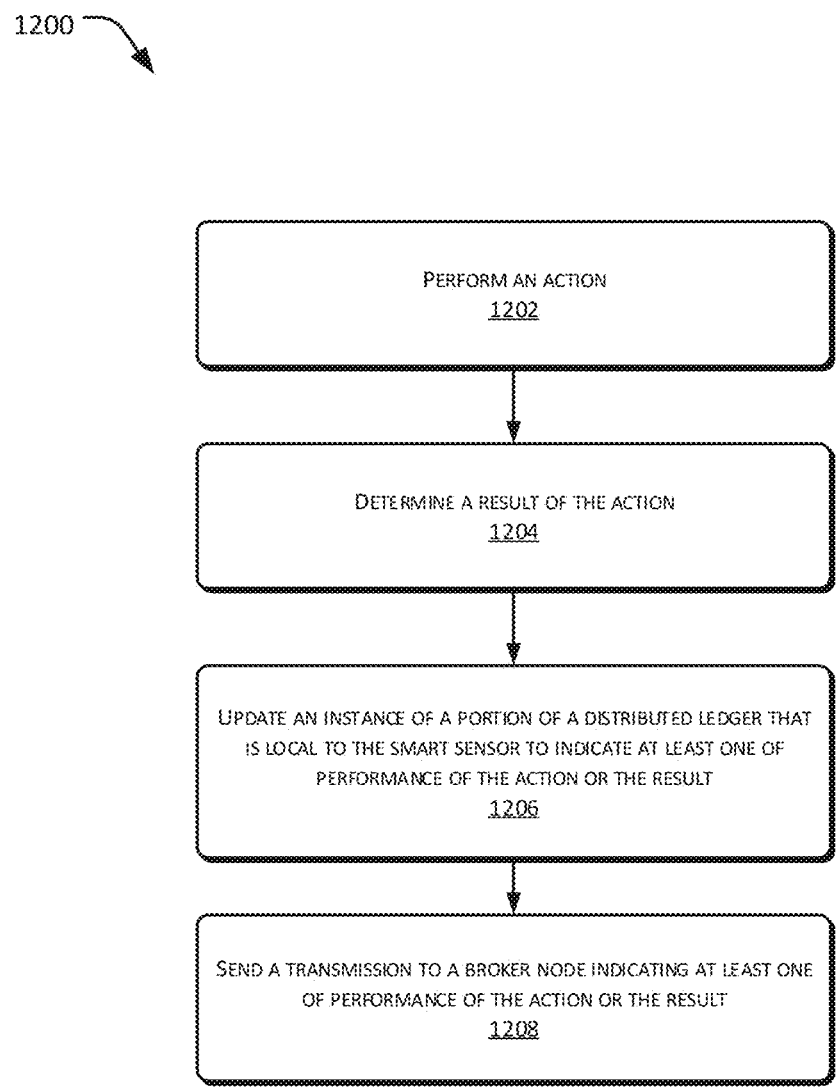
FIG. 12 is a flowchart of an example method that may be implemented by a smart sensor to perform an action.

FIG. 12 is a flowchart which illustrates an example flow of operations 1200 that may be performed by a smart sensor to perform an action an update an instance of a portion of a distributed ledger that is local to the smart sensor indicating performance of the action. The example flow of operations 1200 is described in the context of the example of architecture 100 and with reference to the devices illustrated in FIG. 1. However, the flow of operations 1200 is not limited to use with the architecture 100 and devices of FIG. 1 and may be implemented using other architectures and devices.

The flow of operations 1200 may begin, at block 1202, with the smart sensor performing an action. For example, the smart sensor 106 may perform a location awareness operation by interrogating an installation locator 628. In one example, the installation locator 628 may be permanently affixed to an inside of a service panel that is proximate to the smart sensor. The installation locator may comprise a unique identifier. In some examples, a hash function may be applied to the unique identifier of the installation locator 628 and a unique identifier of the smart sensor 106 (e.g., serial number, machine identifier (MAC), etc.). The smart sensor 106 may interrogate the installation locator 628 installed on the service panel.

In another example, the action may comprise monitoring a balance of funds associated with the smart sensor 106.

In another example, the action may comprise monitoring a power status of a site associated with the smart sensor 106.

At 1204, the smart sensor may determine a result of the action. For example, when performing a location awareness operation, the smart sensor 106 may perform a hash function, and then validate that the calculated identifier matches the identifier stored on a memory of the smart sensor 106.

In another example, when the action comprises monitoring a balance of funds associated with the smart sensor 106, the result may include determining that the balance is below a predetermined threshold and causing the smart sensor 106 to enter a disconnect mode.

In another example, when the action comprises monitoring a power status of a site associated with the smart sensor 106, the result may include determining that the site is experiencing a power outage and causing the smart sensor 106 to enter a disconnect mode.

At 1206, the smart sensor may update an instance of a portion of a distributed ledger that is local to the smart sensor to indicate at least one of performance of the action or the result. For instance, when the smart sensor 106 interrogates the installation locator 628, the smart sensor 106 performs the hash function, and then validates that the calculated identifier matches the identifier stored on a memory of the smart sensor 106. If the validation fails, then the smart sensor 106 may initiate a transaction on the distributed ledger 122 notifying the broker node 114 and/or master node 102 that validation failed and the smart sensor 106 may enter a disconnect mode.

In another example, when the action comprises monitoring a balance of funds associated with the smart sensor 106, the smart sensor 106 may initiate a transaction on the portion of the distributed ledger 122 that is local to the smart sensor 106 indicating that the balance is below a predetermined threshold and the smart sensor 106 has entered a disconnect mode.

In another example, when the action comprises monitoring a power status of a site associated with the smart sensor 106, the smart sensor 106 may initiate a transaction on the portion of the distributed ledger 122 that is local to the smart sensor 106 indicating that the site is experiencing a power outage and causing the smart sensor 106 has entered a disconnect mode.

In some examples, the smart sensor 106 may not contain a distributed ledger and the process 1200 may proceed from step 1204 to step 1208 and skip step 1206.

At 1208, the smart sensor may send a transmission to a broker node indicating at least one of performance of the action or the result. For instance, when performing the location awareness operation, the broker node 114 and/or the master node 102 may receive a transmission from the smart sensor 106 indicating that the smart sensor 106 initiated the transaction on the portion of the distributed ledger 122 that is local to the smart sensor 106 indicating that the validation has failed.

In another example, when the action comprises monitoring a balance of funds associated with the smart sensor 106, the broker node 114 and/or the master node 102 may receive a transmission indicating that the smart sensor 106 initiated the transaction on the portion of the distributed ledger 104 that is local to the smart sensor 106 indicating that the balance is below a predetermined threshold and the smart sensor 106 has entered a disconnect mode.

In another example, when the action comprises monitoring a power status of a site associated with the smart sensor 106, the broker node 114 and/or the master node 102 may receive a transmission indicating that the smart sensor 106 initiated the transaction on the portion of the distributed ledger 104 that is local to the smart sensor 106 indicating that the site is experiencing a power outage and that the smart sensor 106 has entered a disconnect mode.

In other examples in which the smart sensor 106 does not contain a distribute ledger, the smart sensor 106 may send a transmission to the broker node 114 or master node 102 indicating that validation has failed, that the balance is below a predetermined threshold and the smart sensor 106 has entered a disconnect mode, and/or that the site is experiencing a power outage and that the smart sensor 106 has entered a disconnect mode without performing an operation on a distributed ledger.

Example Method of Action Performed by Broker Node

Figure 13:
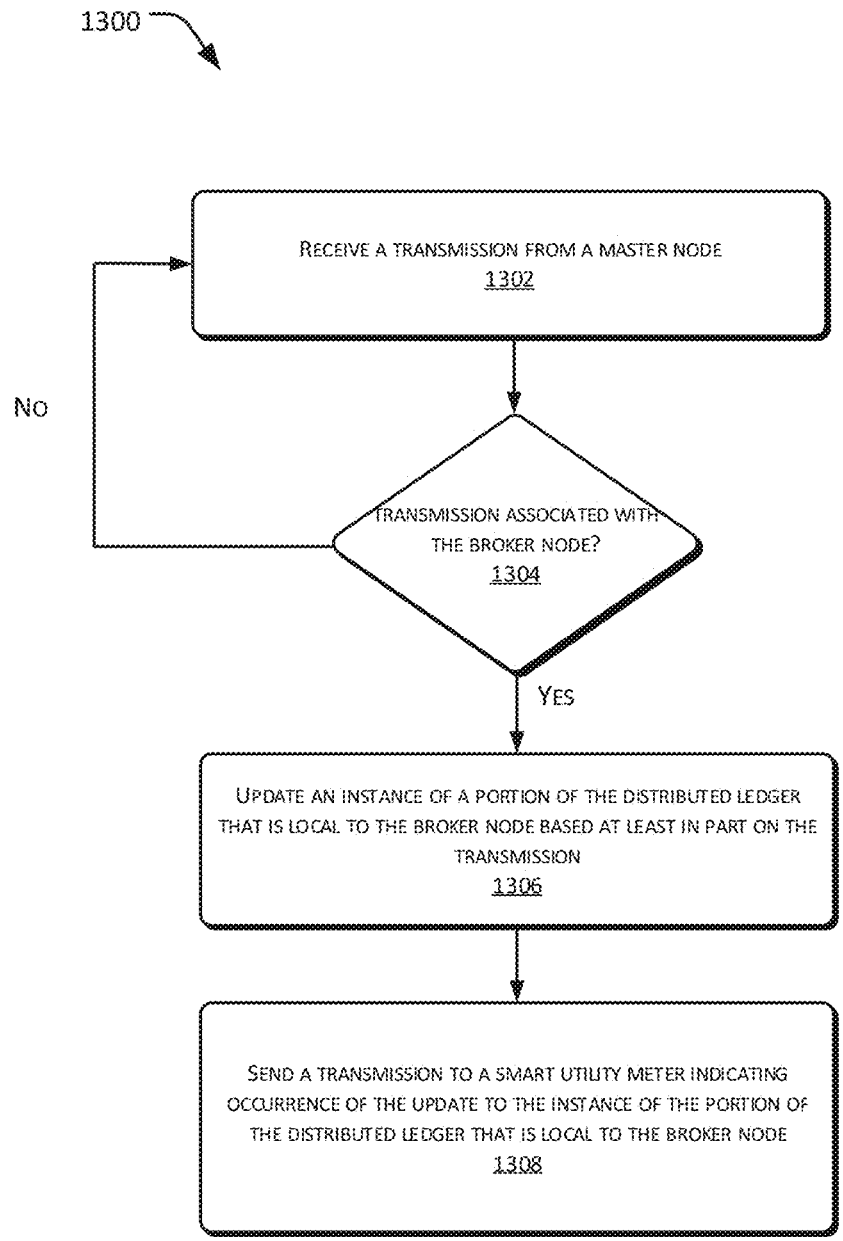
FIG. 13 is a flowchart of an example method that may be implemented by a broker node to perform an action.

FIG. 13 is a flowchart which illustrates an example flow of operations 1300 that may be performed by a broker node to perform an action based on a transmission received from master node. The example flow of operations 1300 is described in the context of the example of architecture 100 and with reference to the devices illustrated in FIG. 1. However, the flow of operations 1300 is not limited to use with the architecture 100 and devices of FIG. 1 and may be implemented using other architectures and devices.

The flow of operations 1300 may begin, at block 1302, with a broker node receiving a transmission from a master node. In some examples, the broker node 114 may receive transaction details from the master node 102 pertaining to a rate contract, meter configuration data, and/or a payment transaction.

At 1304, the broker node may determine if the transmission is associated with the broker node. For example, the distributed ledger module 512 of broker node 114 may determine that the transaction details include information that is relevant to the broker node 114 and/or one of the smart sensors 106 associated with broker node 114 (e.g., smart sensors 106 that are located within the autonomous routing area 108). The transaction details may include a broker node identifier, a broker node type, a smart sensor identifier, and/or a smart sensor type. If the transaction details are relevant, then the process may proceed to 1306. If the transaction details are not relevant, then the process may proceed to 1302.

At 1306, the broker node may update the distributed ledger that is local to the broker node based at least in part on the transmission. For example, in some instances, the distributed ledger 122 that is stored on the broker node 114 may contain blocks that are relevant to the broker node 114 and/or one of the smart sensors 106 associated with broker node 114 (e.g., smart sensors 106 that are located within the autonomous routing area 108).

At 1308, the broker node may send a transmission to a smart sensor indicating occurrence of the update to the distributed ledger that is local to the broker node. For instance, the broker node 114 may transmit a signal to the one or more smart sensors 106 causing the one or more smart sensors 106 to update an instance of a portion of the distributed ledger 122 that is local to the one or more smart sensors 106 to reflect that the update to the distributed ledger. In other examples in which the smart sensor does not contain a distributed ledger, the broker node 114 may send a transmission or signal to the smart sensor 106 causing the smart sensor 106 to perform an action.

The flows of operations illustrated in FIGS. 8-13 are illustrated as collections of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, perform the recited operations. In the context of hardware, the blocks may represent one or more circuits (e.g., application specific integrated circuits—ASICs) configured to execute the recited operations.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A utility network system comprising:
   a master node including a master node distributed ledger, the master node configured to receive a customer transaction and to update an instance of the master node distributed ledger indicating occurrence of the customer transaction;
   a plurality of broker nodes configured to receive an activity instruction including a demand response instruction and meter configuration data for a plurality of smart utility meters located within an autonomous routing area, each broker node comprising an edge node of the autonomous routing area and including a broker node distributed ledger that is applicable to the respective broker node; and
   the plurality of smart utility meters located within the autonomous routing area configured to:
      receive the activity instruction including the demand response instruction and the meter configuration data,
      wherein the demand response instruction includes an indication of which loads of a plurality of loads are needed to be altered in order to fulfill an amount of a resource indicated in the demand response instruction;
      alter an amount of resource provided to at least one load of the plurality of loads; and
      set a signal strength used by at least one smart utility meter of the plurality of smart utility meters based at least in part on the meter configuration data.

2. The utility network system of claim 1, wherein the plurality of loads include at least one of an appliance, an electric vehicle charging station, a lighting system, an HVAC system, or a sprinkler system.

3. The utility network system of claim 1, wherein the at least one smart utility meter alters the amount of resource provided to at least one load of the plurality of loads in response to a user turning off the at least one load.

4. The utility network system of claim 1, further comprising a user device configured to receive a demand response offer from a supplier of the resource and wherein the customer transaction includes an indication that the supplier of the resource received a pledge from the user device to participate in a demand response event and the supplier of the resource is configured to register the at least one smart utility meter to participate in the demand response event in response to receiving the pledge from the user device to participate in the demand response event.

5. The utility network system of claim 4, wherein the master node is further configured to:
   determine that a predetermined threshold of an amount of utility has been met;
   determine that the pledge received from the user device has been fulfilled; and
   transfer funds to update a balance associated with the at least one smart utility meter.

6. The utility network system of claim 4, wherein the demand response offer includes an indication of a credit to be provided to a smart utility meter associated with a user of the user device in response to the user agreeing to participate in the demand response event and the utility network system is further configured to provide the credit to the smart utility meter and updating the instance of the broker node distributed ledger indicating occurrence of providing the credit.

7. The utility network system of claim 1, wherein the master node is further configured to:
   determine that a predetermined threshold of an amount of utility has not been met; and
   send a transmission to at least one broker node of the plurality of broker nodes causing the at least one broker node to determine additional loads of the plurality of loads needed to be altered such that the amount of utility meets the predetermined threshold.

8. A method implemented by a utility network system, the method comprising:
- receiving, at a master node of the utility network system, a customer transaction and updating an instance of a master node distributed ledger indicating occurrence of the customer transaction;
- receiving, at a broker node of a plurality of broker nodes of the utility network system, an activity instruction including a demand response instruction and meter configuration data for a plurality of smart utility meters located within an autonomous routing area, each broker node comprising an edge node of the autonomous routing area and including a broker node distributed ledger that is applicable to the respective broker node;
- receiving, by the plurality of smart utility meters, the activity instruction including the demand response instruction and the meter configuration data, wherein the demand response instruction includes an indication of which loads of a plurality of loads are needed to be altered in order to fulfill an amount of a resource indicated in the demand response instruction;
- altering, by the plurality of smart utility meters, an amount of resource provided to at least one load of the plurality of loads; and
- changing metrology channels collected by at least one smart utility meter of the plurality of smart utility meters based at least in part on the meter configuration data.

9. The method of claim 8, wherein the plurality of loads include at least one of an appliance, an electric vehicle charging station, a lighting system, an HVAC system, or a sprinkler system.

10. The method of claim 8, wherein a respective smart utility meter alters the amount of resource provided to at least one load of the plurality of loads in response to a user turning off the at least one load.

11. The method of claim 8, further comprising receiving, at a user device, a demand response offer from a supplier of the resource and wherein the customer transaction includes an indication that the supplier of the resource received a pledge from the user device to participate in a demand response event and the supplier of the resource is configured to register the at least one smart utility meter to participate in the demand response event in response to receiving the pledge from the user device to participate in the demand response event.

12. The method of claim 11, wherein the master node is further configured to:
- determine that a predetermined threshold of an amount of utility has been met;
- determine that the pledge received from the user device has been fulfilled; and
- transfer funds to update a balance associated with the at least one smart utility meter.

13. The method of claim 11, wherein the demand response offer includes an indication of a credit to be provided to a smart utility meter associated with a user of the user device in response to the user agreeing to participate in the demand response event and the method further comprises providing the credit to the smart utility meter and updating the instance of the broker node distributed ledger indicating occurrence of providing the credit.

14. The method of claim 8, wherein the master node is further configured to:
- determine that a predetermined threshold of an amount of utility has not been met; and
- send a transmission to at least one broker node of the plurality of broker nodes causing the at least one broker node to determine additional loads of the plurality of loads needed to be altered such that the amount of utility meets the predetermined threshold.

15. The method of claim 8, wherein the at least one smart utility meter of the plurality of smart utility meters is further configured to receive a transmission indicating an update to a distributed ledger associated with the at least one smart utility meter, the update including an activity instruction to update a balance associated with the at least one smart utility meter.

16. The method of claim 8, wherein the master node comprises a cross-reference based distributed ledger including an index of cross-reference entries to multiple other distributed ledgers stored by at least one of three hierarchal levels.

17. The method of claim 8, wherein the broker node distributed ledger comprises a transaction based distributed ledger.

18. The method of claim 8, wherein the at least one smart utility meter of the plurality of smart utility meters is configured to:
- perform an action based on the activity instruction received from the broker node; and
- determine a result of the action, the action including performing an installation location determination by scanning an identification tag fixed to a service panel and located in proximity to the at least one smart utility meter and performing validation of the fixed identification tag to determine that the at least one smart utility meter is at an expected location.

19. The method of claim 8, further comprising sending, by the master node, a demand response offer to a user device associated with a customer.

20. The method of claim 8, further comprising receiving, by the master node, a demand response pledge from a user device associated with a customer that indicates an agreement to participate in a future demand response event an amount of resource in which the customer agrees to shed.

* * * * *